H. DE ESCOBALES.
APPARATUS FOR WRAPPING PACKAGES AND INCLOSING SAME IN PREFORMED CONTAINERS.
APPLICATION FILED AUG. 11, 1917.

1,323,163.  
Patented Nov. 25, 1919.  
11 SHEETS—SHEET 1.

Inventor  
H. de Escobales,  
By his Attorneys  
Meyers, Cushman & Rea

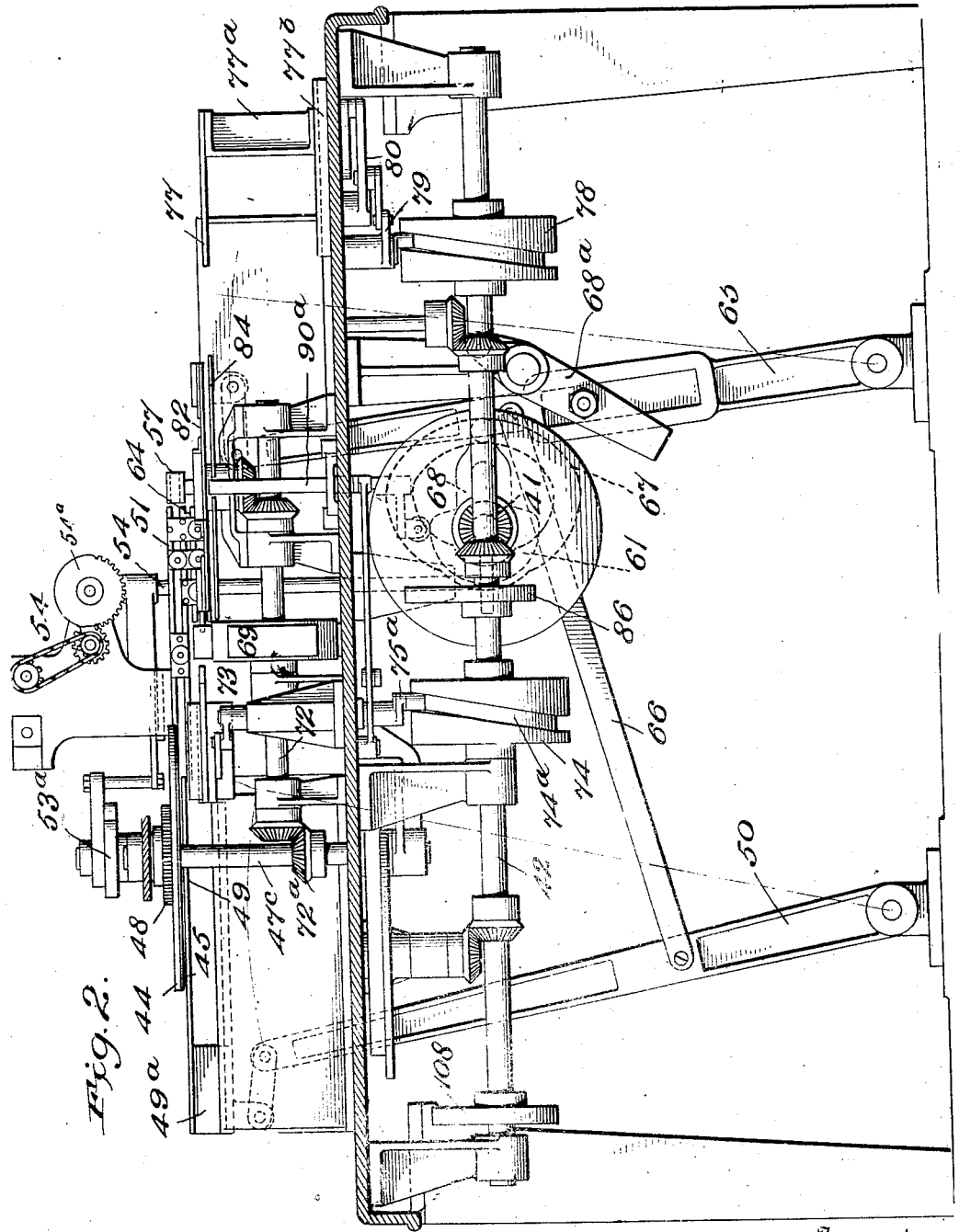

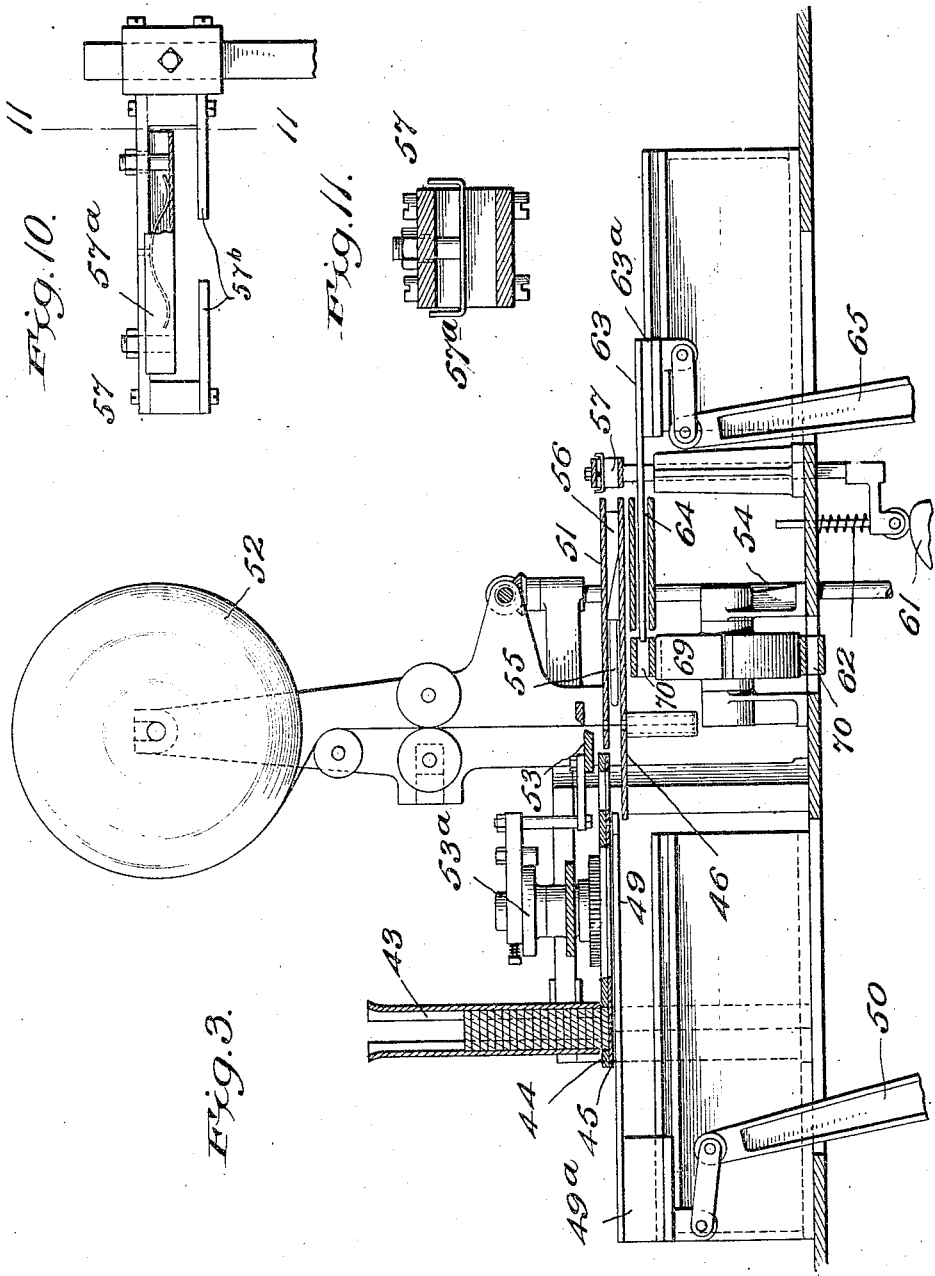

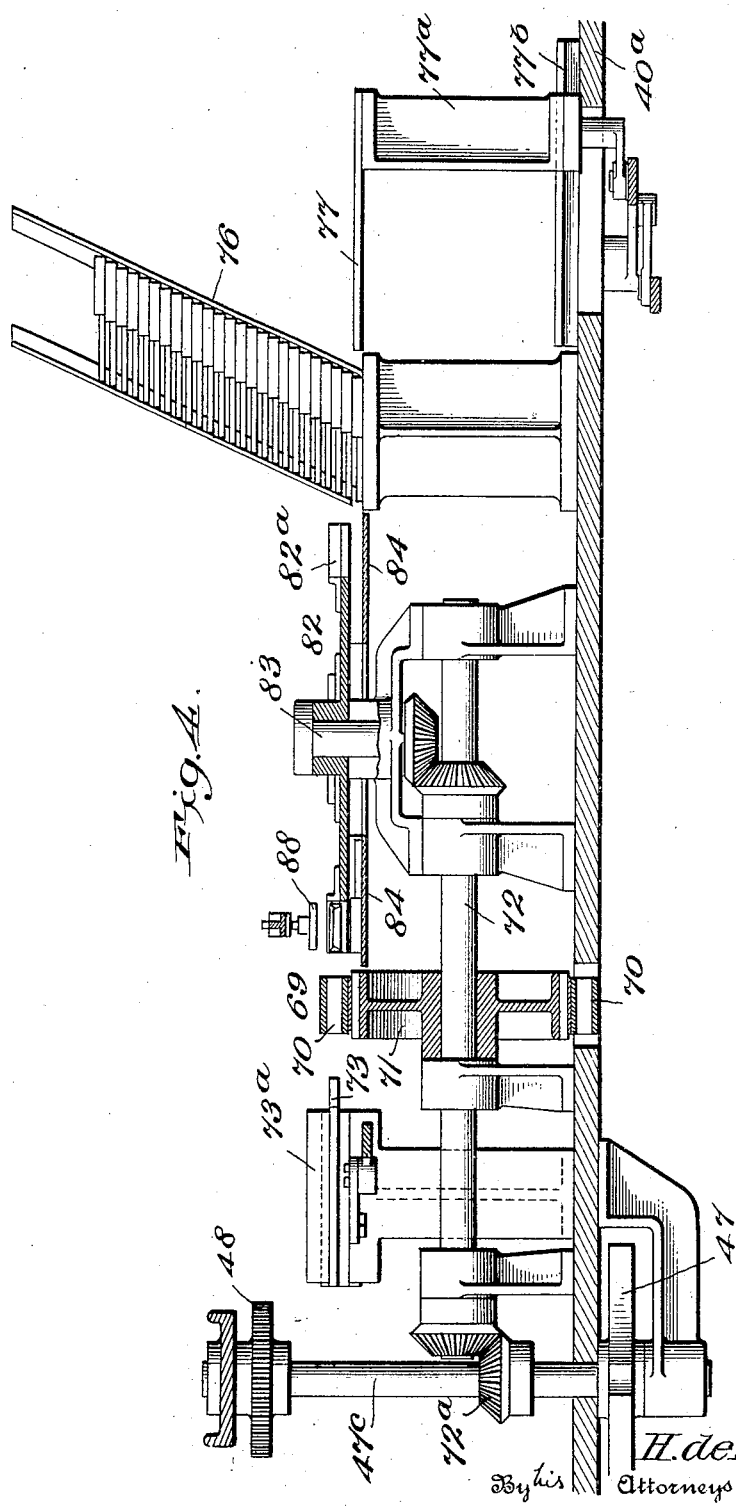

H. DE ESCOBALES.
APPARATUS FOR WRAPPING PACKAGES AND INCLOSING SAME IN PREFORMED CONTAINERS.
APPLICATION FILED AUG. 11, 1917.
1,323,163.
Patented Nov. 25, 1919.
11 SHEETS—SHEET 5.
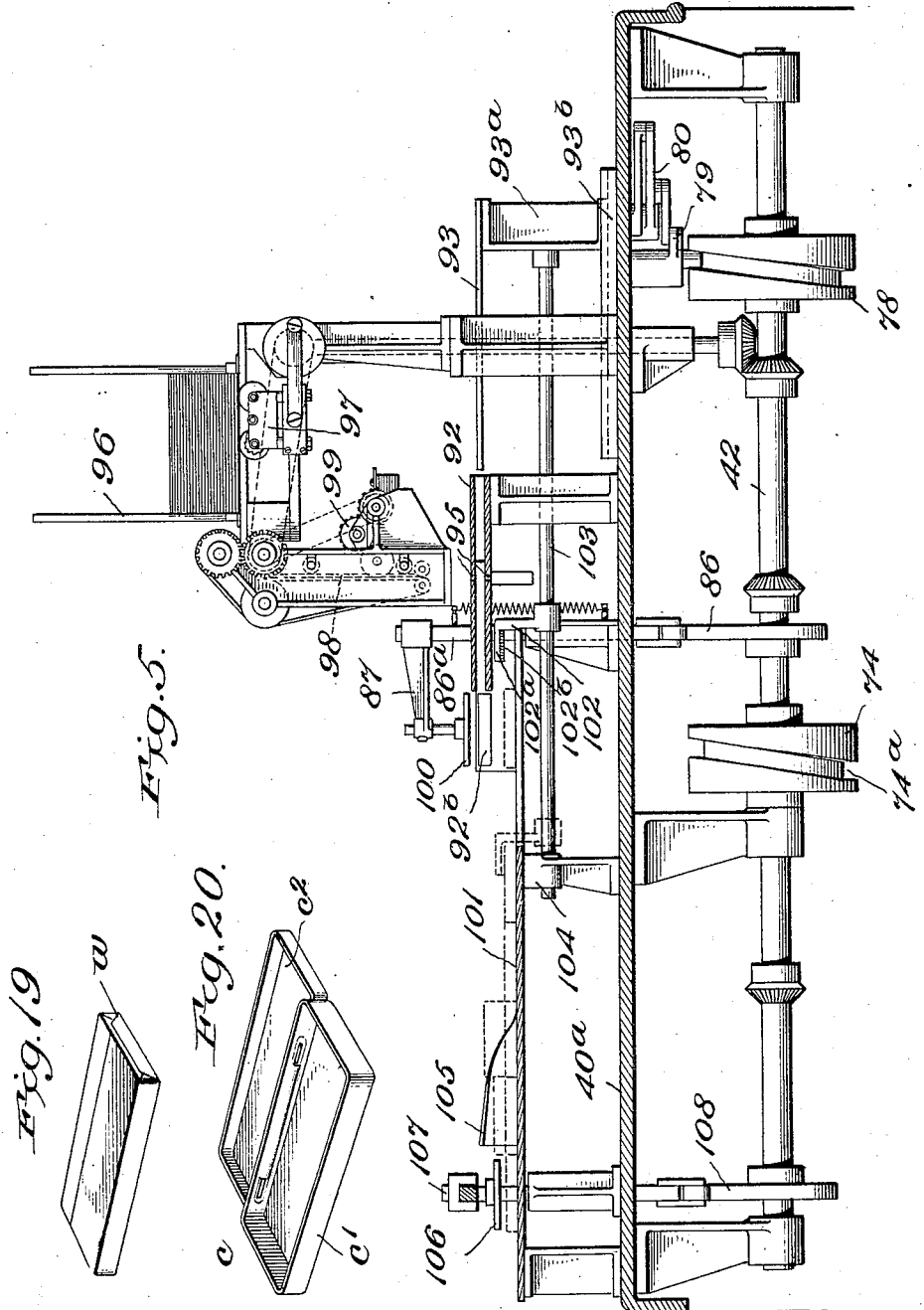
Inventor
H. de Escobales
By his Attorneys
Meyers, Cushman & Rea

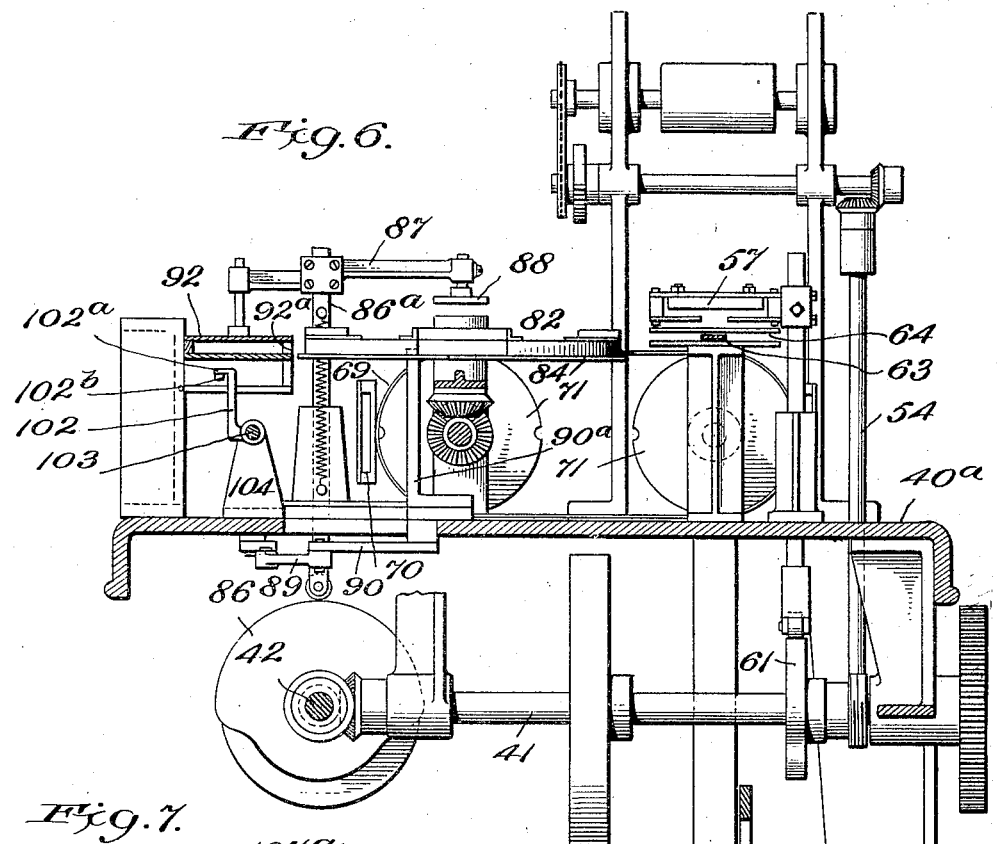
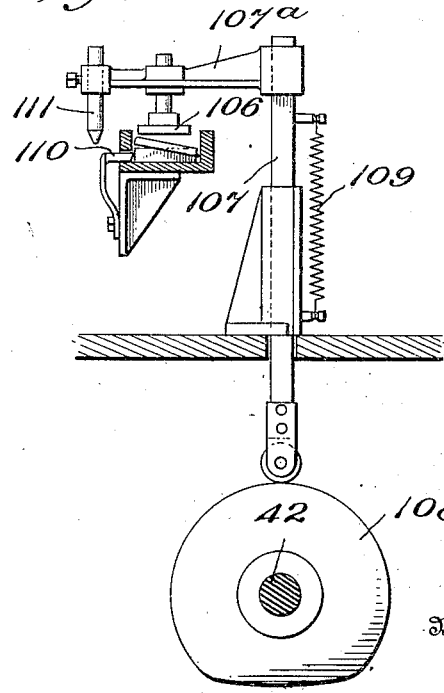
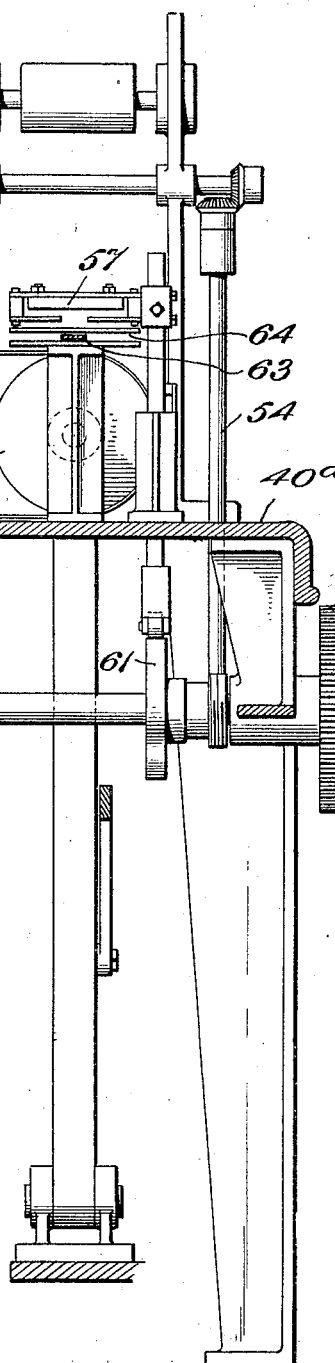

H. DE ESCOBALES.
APPARATUS FOR WRAPPING PACKAGES AND INCLOSING SAME IN PREFORMED CONTAINERS.
APPLICATION FILED AUG. 11, 1917.
1,323,163.
Patented Nov. 25, 1919.
11 SHEETS—SHEET 7.
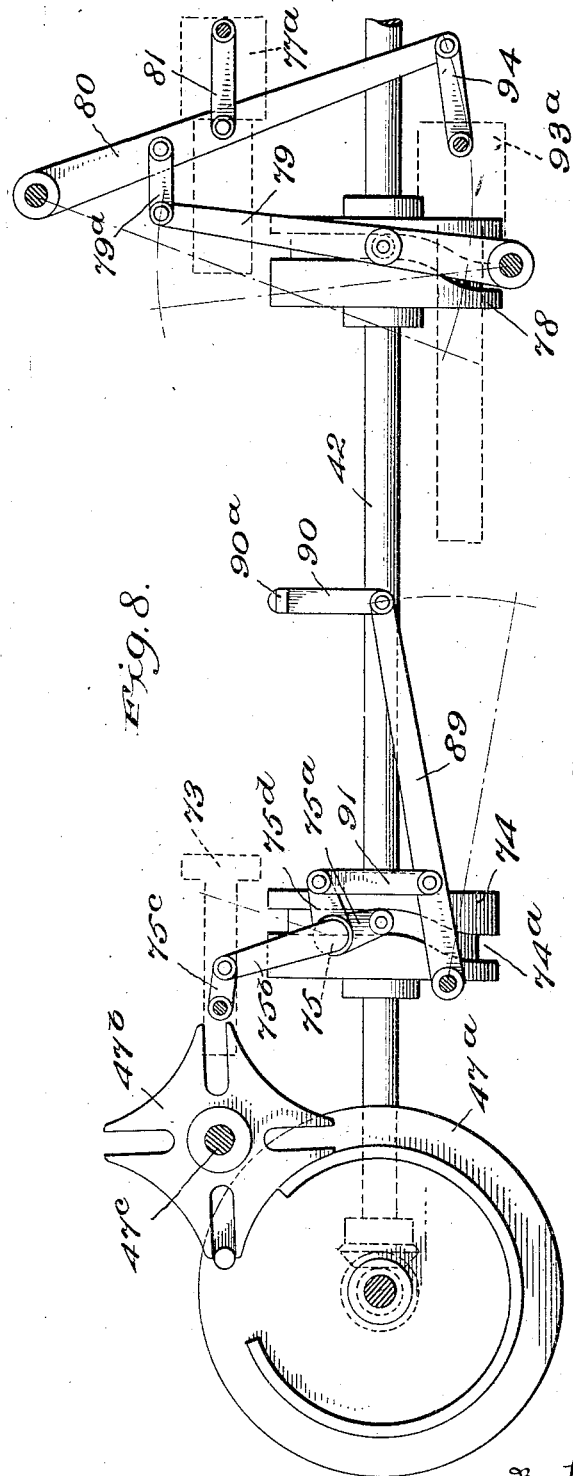
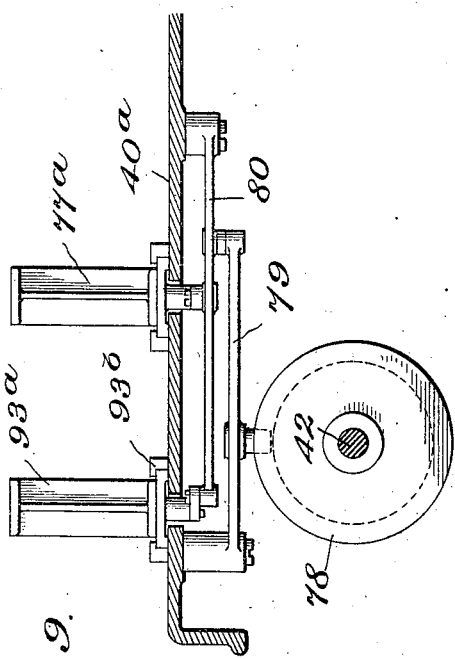
Inventor
H. de Escobales,
By his Attorneys
Meyers, Cushman & Rea H. DE ESCOBALES.
APPARATUS FOR WRAPPING PACKAGES AND INCLOSING SAME IN PREFORMED CONTAINERS.
APPLICATION FILED AUG. 11, 1917.
1,323,163.
Patented Nov. 25, 1919.
11 SHEETS—SHEET 8.
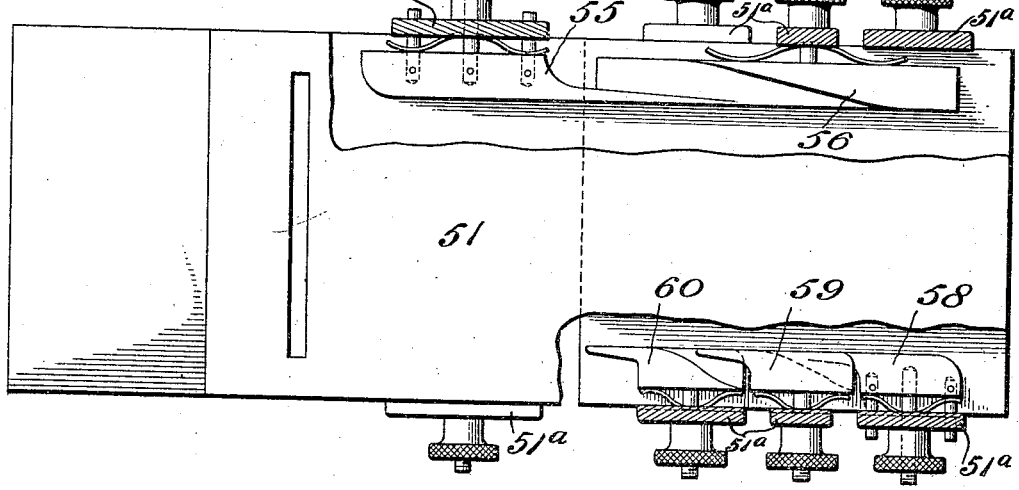
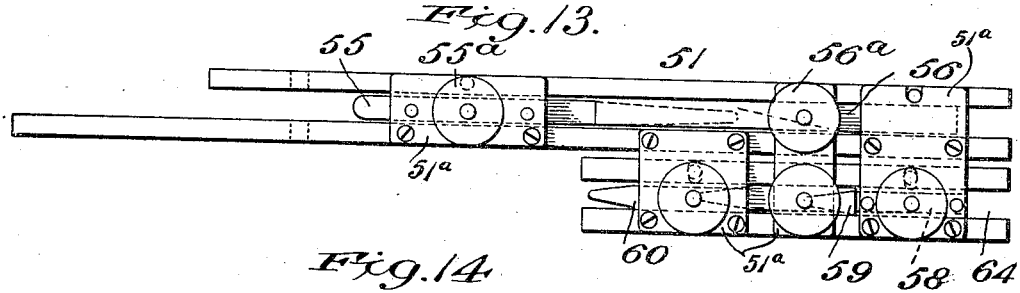
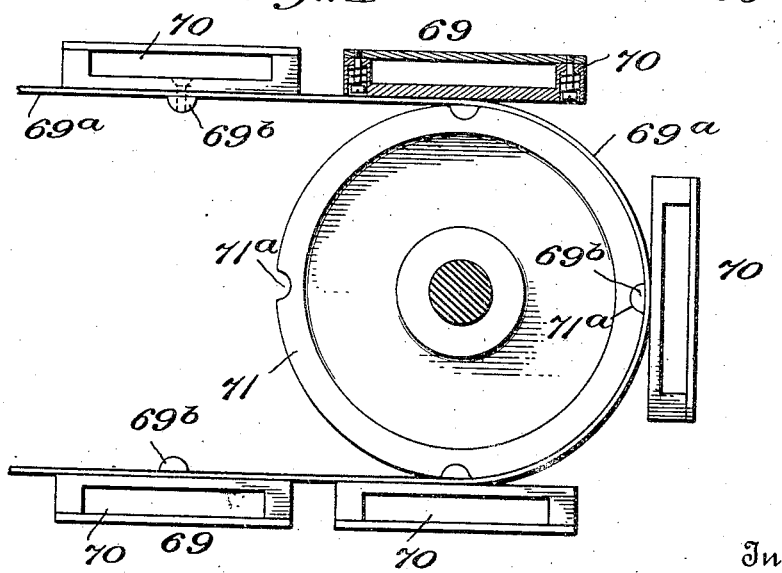

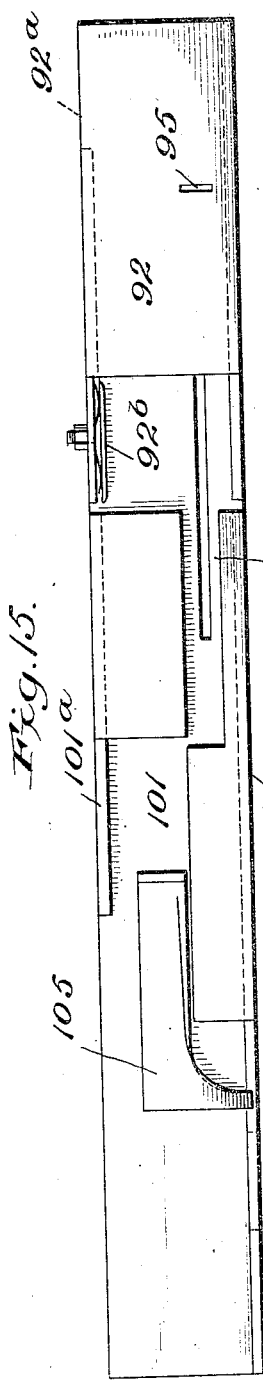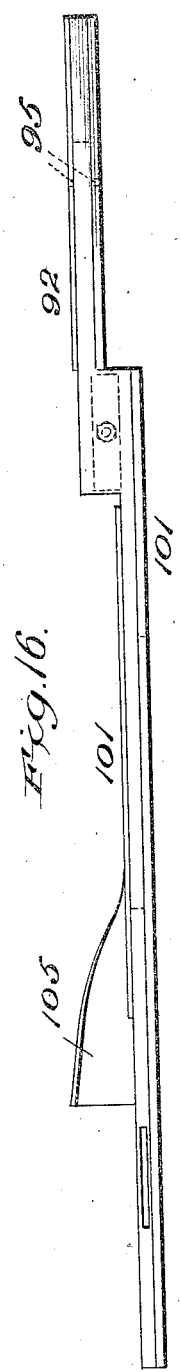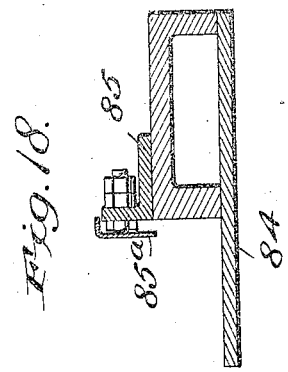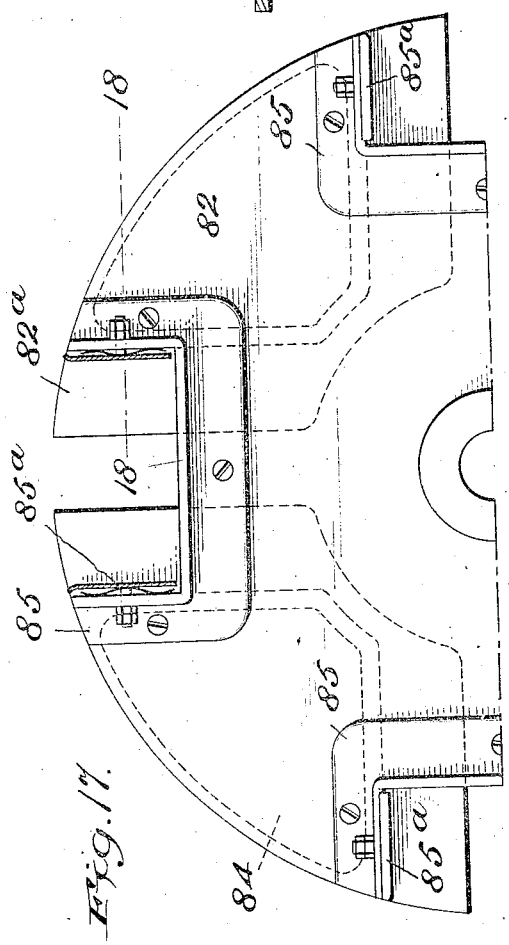

H. DE ESCOBALES.
APPARATUS FOR WRAPPING PACKAGES AND INCLOSING SAME IN PREFORMED CONTAINERS.
APPLICATION FILED AUG. 11, 1917.

1,323,163.

Patented Nov. 25, 1919.
11 SHEETS—SHEET 10.

Inventor
H. de Escobales,
By his Attorneys
Meyers, Cushman &c.

UNITED STATES PATENT OFFICE.

HILARION de ESCOBALES, OF NEW YORK, N. Y.

APPARATUS FOR WRAPPING PACKAGES AND INCLOSING SAME IN PREFORMED CONTAINERS.

1,323,163.  Specification of Letters Patent.  Patented Nov. 25, 1919.

Application filed August 11, 1917. Serial No. 185,745.

*To all whom it may concern:*

Be it known that I, HILARION DE ESCOBALES, a citizen of the United States, residing at New York, in the county of New York and State of New York, have invented new and useful Improvements in Apparatus for Wrapping Packages and Inclosing Same in Preformed Containers, of which the following is a specification.

This invention relates to the production of packages, pertaining more particularly to apparatus for producing packages in which the commodity is automatically wrapped and positioned within a preformed container.

The present invention is designed more particularly for the packaging of commodities such, for instance, as plug tobacco, the apparatus automatically inclosing the plug within a wrapper by an automatic wrapping operation, then positioning the wrapped plug in a metallic or other preformed container and, before the latter is closed, applying a label or revenue stamp in such manner as to retain the wrapped plug within the container while the stamp or label remains intact, and then closing the container, a portion of the label or stamp being exposed on a face of the package, the label or stamp, however, being so positioned as to permit the container to be opened without mutilating the stamp or label.

Other objects of the invention are to provide an apparatus adapted to provide this result in an automatic sequence of operations, and by apparatus which is simple and efficient in operation, durable in construction, capable of large capacity, and which can be manufactured at a relatively low cost.

To these and other ends, the nature of which will be readily understood as the invention is hereinafter disclosed, said invention consists, in the improved construction and combination of parts hereinafter fully described, illustrated in the accompanying drawings, and more particularly pointed out in the appended claims.

In the accompanying drawings, in which similar reference characters indicate similar parts in each of the views:

Fig. 2 is a vertical longitudinal cross-sectional view of a portion of the machine, with parts omitted for the sake of clearness.

Fig. 3 is a vertical cross-sectional view taken on line 3—3 of Fig. 1.

Fig. 4 is a vertical cross-sectional view taken on line 4—4 of Fig. 1.

Fig. 5 is a vertical cross-sectional view taken on line 5—5 of Fig. 1.

Fig. 6 is a vertical cross-sectional view taken on line 6—6 of Fig. 1.

Fig. 7 is a cross-sectional view taken on line 7—7 of Fig. 1.

Fig. 8 is a detail view of a certain operating mechanism, showing the Geneva movement, and cams and levers operated thereby.

Fig. 9 is an end elevation of the parts shown in Fig. 8 looking toward the left.

Fig. 10 is an enlarged detail view of a portion of a transferring carrier.

Fig. 11 is a cross-sectional view taken on line 11—11 of Fig. 10.

Fig. 12 is an enlarged detail plan view (parts shown broken away for the sake of clearness) of one form of folding channel structure.

Fig. 13 is a side elevation of the same.

Fig. 14 is an enlarged detail side elevation, partly in section, of a portion of a conveyer.

Fig. 15 is an enlarged plan view of the container closing device.

Fig. 16 is a side elevation thereof.

Fig. 17 is an enlarged detail plan view of a portion of the container positioning dial.

Fig. 18 is a cross-sectional view taken on line 18—18 of Fig. 17.

Fig. 19 is a detail perspective view of the wrapped plug of tobacco.

Fig. 20 is a detail perspective view of the container.

Figs. 21 to 29 inclusive are perspective views showing successive stages in the wrapping of the plug.

Figs. 30 to 33 inclusive are perspective views showing stages in the stamp or label-applying operation.

Figure 34:
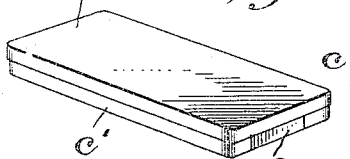

Fig. 34 is a perspective view of the completed package.

The present invention is designed generally for the purpose of packaging articles or commodities within a preformed container by an automatic cycle of operations which will enable the packaging to be provided with assurance of substantial uniformity in the package production, and which can be provided with more or less rapidity thereby enabling a comparatively large output from the apparatus.

For the purpose of explaining the invention and its principles, and as illustrating one way in which the invention can be carried out, I have shown the apparatus as designed for packaging plugs of tobacco within a metallic container of the hinged lid type, the packaging operation including the application of a stamp affixed to the package to meet the governmental requirements, thus producing a package complete and ready for the market.

Before giving a detail description of the apparatus and to permit a clearer understanding of the principles of operation to be had, a brief description of the general cycle of operations is given, the results accruing from the successive operations being shown in the various views indicated as Figs. 19 to 34 inclusive.

Figure 21:
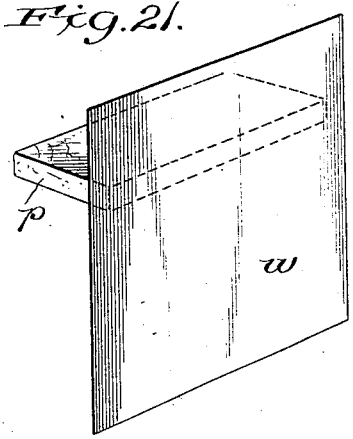
Figure 22:
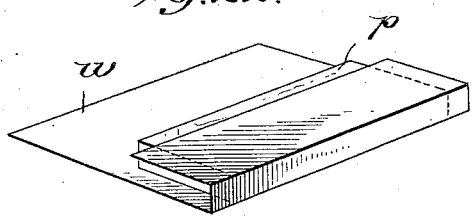
Figure 23:
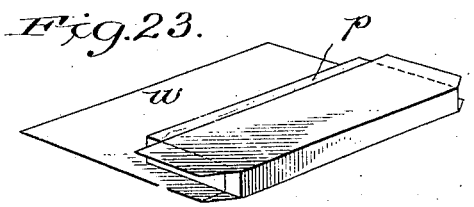
Figure 24:
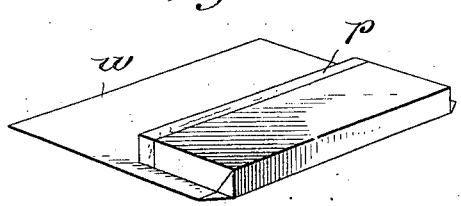

The plug of tobacco, indicated at $p$, is shown in Fig. 21 as of elongated type. However, the apparatus is not limited to this particular form of plug, since the apparatus disclosed herein is designed, with minor changes, to operate in connection with square plugs.

The container, indicated at $c$, has the body portion $c'$ and lid $c^2$, the lid being hingedly connected to the body portion in suitable manner and preferably so that the lid will telescope over the body portion when the container is closed. As heretofore indicated, the container is preformed, being delivered into the container-magazine of the apparatus with the lid open as indicated in Fig. 20.

Figure 29:
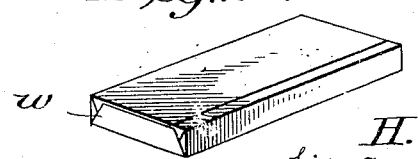

The wrapper $w$ is of suitable material as, for instance, a sheet of paper which may be of the paraffin type, if desired, or a composite sheet which may or may not include tin foil as an element, said wrapper—more or less flexible in character—being of such size that, when folded, will completely inclose the plug, producing a packet such as shown in Figs. 19 and 29.

The stamp is indicated at $s$ and is the usual Government internal revenue stamp, the stamps being supplied to the stamp magazine substantially free from adhesive, the latter being applied as the stamp is positioned for service.

The plugs art successively delivered from a magazine into a rotatable dial by which each is transferred to a position over a channel, the positioned plug being then introduced into the channel in advance of a reciprocating plunger which advances the plug into contact with an intermediate portion of the wrapper, as in Fig. 21, the wrapper being fed into position by suitable feed mechanism. The advance of the plunger then carries the wrapper and plug into a folding channel which first folds the wrapper to the position shown in Fig. 22, then tucks in the advance tucks as in Fig. 23 and then turns down the upper end flaps, as in Fig. 24, these operations taking place as the plunger advances the wrapper and plug through the folding channel, the embryo packet of Fig. 24 being introduced into a vertically-movable transferring carrier, the trailing portion of the wrapper remaining within the folding channel. This completes the activity of this plunger which then returns to its initial position to advance the succeeding plug and wrapper.

The transfer carrier then moves downwardly and, during such movement, turns up the trailing portion of the wrapper, as in Fig. 25, the completion of the downward movement of the carrier locating this formation opposite the entrance to a second folding channel located substantially parallel to and below the first folding channel. In this position, a second plunger advances and moves the formation of Fig. 25 in a direction opposite that previously provided and out of the carrier into the second folding channel, the advance of the plunger first turning down the trailing portion of the wrapper on to the top of the plug, as in Fig. 26, then tucking in the rear tucks (now become the tucks in advance) as in Fig. 27, the continuing movement of the plunger successively folding down the remaining top end flaps as in Fig. 28, and then turning up the bottom end flaps and completing the packet as shown in Fig. 29.

As will be seen, the upper overlapping end flaps are not turned in concurrently, as is the usual practice, the particular method of folding shown herein being designed to facilitate folding in the second channel, the sequence of folding in the first channel placing the upper end flap over the advance tuck before the plug and wrapper are moved into the second folding channel, thus eliminating any possibility of the tucking-in folders of the second channel affecting the advance tucks which had been provided in the first channel, and which, during the movement in the second channel, would be in a position to possibly engage the tucking-in folders of that channel and disarrange the tuck which had been previously provided. While this arrangement is of advantage in the operation, it also is of advantage in the completely wrapped packet, since the product then has one of the end flaps underlying one of the tucks, the latter being in turn overlapped by both end flaps, thus tending to increase the ability of the wrapped packet to retain its folded condition and tending to prevent relative movement of the plug and wrapper should the folded end flaps slightly loosen.

The completion of the advance movement of the packet of Fig. 29 carries this packet out of the second folding channel into an open ended receptacle carried by a belt and which forms a portion of a carrier for transferring the packet laterally out of the path of travel of the succeeding packet. The positioned packet is then moved by the carrier to a point opposite a dial on which the container which is to receive the packet is positioned, the carrier coming to rest at a point where a plunger will shift the packet from the carrier into a position over the open body portion of the container, Figs. 19 and 20 indicating somewhat the relative positions of the container and packet at this time, excepting that the packet lies but a short distance above the body of the container, the packet being held in position by walls carried by the dial.

The containers are supplied with opened lids from a suitable container-magazine. A plunger operates to deliver a container to a pocket within the container-carrying dial, the lid being in advance during this movement, the completion of the plunger movement positioning the body of the container on the dial at a point where the rotation of the dial will place this body portion directly underneath the point where the packet is to be positioned. When, therefore, the packet has been positioned above the container body, as described, a vertically reciprocating plunger moves the packet downward into the body of the container, thus locating the packet within the container, producing the embryo package shown in Fig. 30.

Figure 33:
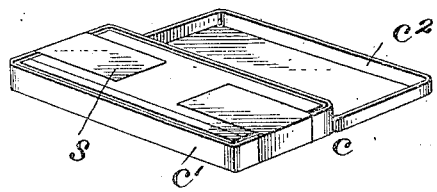

The dial is then shifted, carrying the positioned packet and container opposite the side opening to a channel into which the container—with the positioned packet—is moved by a reciprocating finger, thus taking the container from the dial and locating it in the channel in advance of a plunger which is adapted to move the container through the channel. Advance of the embryo package in the channel by the plunger brings the body of the container into contact with a portion of the adhesively coated face of the stamp, as in Fig. 30, the advancing movement of the container turning in one end of the stamp over the top of the packet, the remainder of the stamp extending over the advance end of the container and along the bottom of the container, the remainder of the stamp then trailing, as in Fig. 31. The stamp is automatically positioned to intersect the channel so as to be in proper position as the container is advanced, folding of the stamp in the manner indicated being provided by the channel through which the container is passing. Continued advance of the container carries it out of the channel and over an opening in the bottom of the channel, the trailing portion of the stamp remaining in the channel. The embryo package is then moved downwardly within the well onto a table, this movement acting to turn up the trailing portion of the stamp to the position shown in Fig. 32. This position of the embryo package locates it in advance of a member which acts to advance the positioned container, this member, however, having an arm carrying a brush or other wiping instrumentality which passes into contact with the upwardly extending portion of the stamp before the member contacts with the end of the container, the result being that as this member advances, the upwardly-extending portion of the stamp is wiped on to the top rear end of the packet, as shown in Fig. 33, thus applying the stamp to the ends and bottom of the container and on to the opposite top ends of the packet, a position which will retain the packet within the container when the lid is open and so long as the stamp retains intact.

The remaining operation is to close the container, and this is provided by moving the container and lid past the lid-lifting device which raises the lid beyond the vertical so that it is in position to be closed by a plunger, the front wall of the container body being pressed inward just prior to and during the plunger movements, so that the lid can readily pass to position, thus producing the product shown in Fig. 34.

It should be noted that while a comparatively large number of operations are provided, the operating mechanisms are of simple type and more or less interconnected in such manner as to provide for proper timing and the use of a minimum number of driving mechanisms.

In describing the apparatus, the description will follow, as far as practicable, the cycle of operations above indicated, substantially following the course and manipulations employed in producing one of the packages shown in Fig. 34.

The apparatus for providing the packet wrapping operation, the successive steps of which are shown in Figs. 21 to 29 inclusive, is of the type disclosed in my companion application filed June 8, 1917, Ser. No. 173,558, the general structure for providing this particular operation being fully disclosed and claimed in the said application. In describing the present invention, therefore, the description of parts pertaining to this particular portion of the apparatus is more or less general, the specific changes made being described more in detail.

40 indicates a suitable frame having a top 40ª. 41 indicates a drive shaft of the apparatus, this being driven from a suitable source of power indicated as pulleys 41ᵃ. Shaft 41 has a gear connection with a shaft 42, the latter forming the main power shaft of the apparatus, the majority of the mechanisms or instrumentalities being driven by this shaft 42.

43 indicates a magazine for the commodity, being shown as a magazine for plugs—which may be considered as charges. This magazine being positioned over a dial 44 having a plurality of openings 44ᵃ—shown as four in number—adapted to be successively positioned beneath magazine 43. Dial 44 (Fig. 3) is mounted above an annular plate 45 which forms a bottom for openings 44ᵃ excepting at one of the positions or stations of the dial, this position, in the drawings, being opposite that at which the magazine is active, plate 45 having an opening corresponding to opening 44ᵃ at this point, so that a plug, which is received in dial opening 44ᵃ beneath the magazine, remains within the dial during dial travel until it reaches a position directly over the opening in plate 45, whereupon it is free to drop down through said opening on to a plate 46 which practically forms the bottom of the first folding channel.

Figure 1:
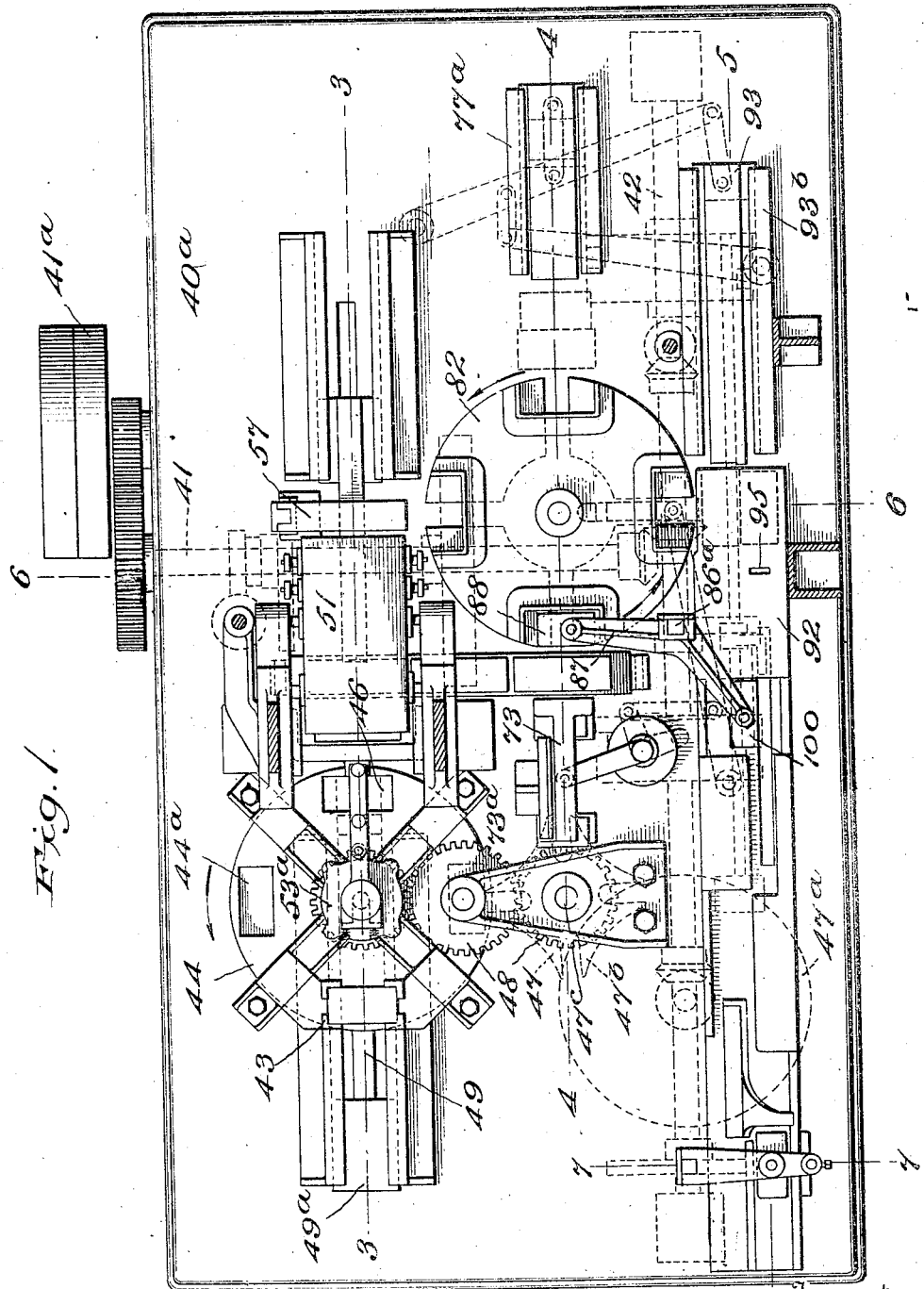
Figure 1 is a top plan view of apparatus adapted to carry out the principles of the invention, with parts shown omitted and parts shown broken away, for the sake of clearness.

Dial 44 is moved intermittently by the action of a Geneva stop movement, shown partially in Fig. 8 and diagrammatically in dotted lines in Fig. 1 and indicated generally at 47, constantly rotating element 47ᵃ being driven from shaft 42, the complemental element 47ᵇ, mounted on vertical shaft 47ᶜ, operating to drive the shaft of dial 44 through gears indicated at 48, the general operation causing the dial to travel an angular distance of 90°, it being understood, of course, that they may be varied to meet the exigencies of use.

The plug or charge deposited on plate 46 is located in advance of a plunger 49 carried by slide 49ᵃ actuated by a lever 50, this arrangement being similar to the companion application. The first folding channel, indicated generally at 51, is provided, in advance of the position where the plug enters the channel, with an opening to receive the wrapper $w$, the latter being preferably provided from a web indicated generally by roll 52, the wrapper leading through suitable delivery rolls adapted to feed a predetermined length of web, between the jaws of a suitable cutting device indicated at 53 and actuated by a cam 53ᵃ on the shaft of dial 44. The web feed mechanism is operated from shaft 41 (Fig. 6) through shaft 54 and gear and chain connections to the shaft of roll 52, these connections including a mutilated gear structure 54ᵃ (Fig. 2) to provide for intermittent web feed upon completion of which the wrapper extends through folding channel 51. The web feeding mechanism and the wrapper-severing mechanism is of the type disclosed in the companion application and hence is not more fully described herein in detail, it being sufficient to state that the proper length of web is fed to locate the advance end below channel 51—an illustrative example of the position of the advance end of the web relative to the channel being indicated in the position of the plug and wrapper in Fig. 21. After the web has reached this position, further feed movement ceases and the severing apparatus is made active, this being provided by the action of cam 53ᵃ on the shaft of dial 44. Both operations take place prior to the beginning of the advance movement of plunger 49. The completion of the severing operation provides a wrapper of proper length and properly positioned to intersect channel 51, so that as plunger 49 advances the plug, the latter is brought into contact with the wrapper blank and both are advanced in the folding channel with a portion of the wrapper extending rearward as in Fig. 22. The embryo packet, after the initial folding indicated in Fig. 22, passes successively into the operating zones of tucking-in folders 55 for tucking in the advance tucks of the packet (Fig. 25 and down turning folders 56 for turning down the previously formed upper end flap (Fig. 24), the embryo packet being advanced into the vertically reciprocating carrier 57 which, at the time when plunger 49 is completing its advance movement, is positioned opposite the end of channel 51. As shown, channel 51 is preferably formed of upper and lower parallel plates spaced apart, thus leaving the sides of the channel open, the edges of the plate carrying bridging members 51ᵃ at the proper points to support the folders.

In the companion application, folder 56 is omitted, all of the end flaps being folded in the second channel. The prelimin folding in the first channel of one of the upper end flaps forms one of the distinctions over the structure of the companion application, this difference, the form of the folders of the first and second channels, and the arrangement of carrier 57, forming the main differences in structure over the companion application.

As shown in Figs. 12 and 13, folders 55 and 56 are preferably yieldably and adjustably supported, springs being interposed between members 51ᵃ and the folders, the latter carrying threaded stems extending through members 51ᵃ and forming part of the set screw structures 55ᵃ and 56ᵃ, this arrangement being preferred not only to readily accommodate for different lengths of plugs,—variations provided by adjustment through set screws 55ᵃ and 56ᵃ—but also to accommodate the folders to any slight inaccuracies in the shape of the ends of the plug, it being readily understood that plug formations may vary slightly. Since it is desired that the folding be substantially close fitting, it will be understood that the yieldability of the folders is of positive advantage in this respect.

As will be seen, folder 55 is thinned in the direction of packet advance to form what may be considered as a tail for the folder, this tail overlapping folder 56, thus providing the proper face for maintaining the tucks in tucked position and at the same time permit the top end flap to begin its folding through the action of folder 56.

From the above, it will be seen that bridging members 51$^a$, and the parts carried thereby, viz: the folders or tuck-in fingers, the adjusting device, and the springs, provide unit formations each of which not only serves its purpose as a part of the general structure in the operation but, in addition, is of a form which is removable bodily through the respective sides of the channel without affecting the top and bottom plates of the channel, thus making it possible to assemble or take down the structure in a simple and efficient manner for purpose of substitution or repairs.

Carrier 57 is shown more in detail in Figs. 10 and 11, a yieldable wall 57$^a$ being carried by the top of the carrier so as to maintain the folded portions of the wrapper in position when the embryo packet is advanced into the carrier, it being readily understood that the wall may yield if necessary, and will maintain the packet in position.

As will be seen in Fig. 10, the lower wall of the compartment provided in carrier 57 is formed by a pair of opposing plates or members 57$^b$ located in the same plane, but spaced apart at a point intermediate the side walls of the compartment, this space being located in vertical alinement with plunger 63. This arrangement not only provides for an efficient carrier structure, but, in addition, allows greater freedom of movement of the carrier, since the latter may have its upward movement before plunger 63 has been withdrawn from the position of the carrier, as will be readily understood from the showing of Fig. 3. To permit this, the carrier is preferably supported at its side, as indicated in Fig. 10.

Figure 27:
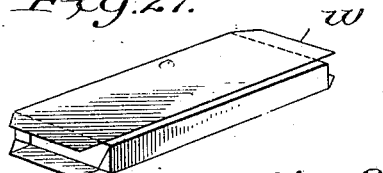
Figure 28:
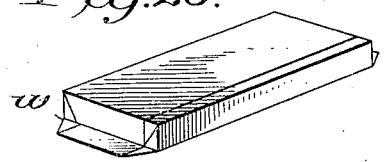

At this point it may be noted that folders 58, 59 and 60 of the second channel (shown at the bottom in Fig. 12) have the same general characteristics as folders 55 and 56, folders 58 tucking in the advance tucks of the second channel to produce the structure of Fig. 27, folder 59 turning down the second upper end flap, as in Fig. 28, folder 60 turning up the lower end flap to produce the result of Fig. 29. These folders are also adjustably and yieldably supported, and have the somewhat similar overlapping relation as said folders 55 and 56.

The advancing movement of plunger 49 delivers the embryo packet into carrier 57, as heretofore pointed out, plunger 49, however, remaining within channel 51. When the embryo packet is thus positioned in the carrier, the latter is lowered through the action of a cam 61 and spring 62, the carrier support moving downward under the action of the spring when cam 61 permits of this movement, said cam being mounted on shaft 41. This movement of the carrier folds up the trailing portion of the wrapper of Fig. 24 into the position shown in Fig. 25, and locates the packet opposite the entrance to the second channel and in the path of travel of a second plunger 63, the second channel being indicated generally at 64. Plunger 63 is mounted in a slide 63$^a$ and is reciprocated by means of a lever 65, levers 50 and 65 being operatively connected by connection 66 (Fig. 2), these connections causing the levers to be moved in unison, plungers 49 and 63 traveling in similar directions, but having locations relative to carrier 57 such as to cause the approach movements to the carrier to be provided alternately. Owing to the fact that the lower wall of carrier 57 is formed as described, said carrier may be shifted upwardly at any time after the movement of plunger 63 has carried the positioned packet and its trailing portion into channel 64, thus assuring that carrier 57 will be in its upper position in advance of the time of arrival of the succeeding packet being advanced by plunger 49. As in the companion case, levers 50 and 65 have their movements provided by a cam 67, this cam serving to reciprocate an arm 68 which is operatively connected to lever 65 through a crank device and a rocking lever 68$^a$ which is slidably connected to lever 65. This structure is described in detail in the companion application and hence is not more particularly described herein, it being understood that the movements of cam 61 serves to oscillate lever 65 and that these oscillations are made active on lever 50 through connection 66.

Figure 25:
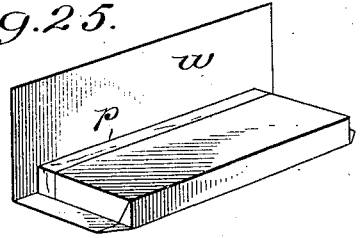
Figure 26:
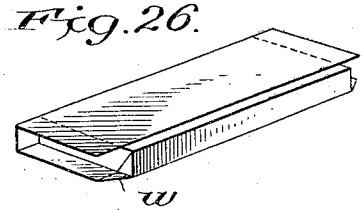

As a result, when carrier 57 is moved downward opposite the entrance to the second channel 64, plunger 63 advances and carries the embryo packet out of the carrier and into folding channel 64, the entrance of the packet into channel 64 folding the wrapper from the condition shown in Fig. 25 to that shown in Fig. 26. As the packet is advanced in channel 64, it is successively brought into coöperation with folders 58, 59 and 60, thus providing the successive wrapper end flap manipulations shown in Figs. 27 to 29 inclusive, the completion of the advance movement of plunger 63 delivering the completed packet into one of the members of a transverse carrier presently described, such member forming the equivalent of the packet-receiving station of the companion application, positioning of the packet in this member removing the packet from the wrappng instrumentality or mechanism.

As heretofore indicated, this general wrapping instrumentality—with the exception of the particular form of the folders and of the carrier—is substantially that described more in detail and claimed in the companion application above identified, and is therefore not further described in detail herein, it being understood that the plug is taken from the plug magazine, delivered to the entrance to the folding channel, the wrapper produced and positioned to intersect the path of travel of the plug, the plug advanced to provide a part of the wrapping operation and delivered into a carrier from which it is transferred into a second folding channel where the packet is completed and then delivered into a packet delivery station.

During these folding operations the ends of the wrapper are folded into overlapping relation on a face of the plug, the end tucks provided and the end flaps turned in, these operations taking place in each channel, the tucking in operation preceding end flap folding, the latter folding in the first channel being provided on one of the wrapper ends, the similar folding in the second channel being on the opposite wrapper end which is then in its overlapping position.

The remaining packaging operations are more or less individual to a different type of package from that disclosed in the companion application, and the description of the several instrumentalities is given in detail.

The transverse carrier indicated generally at 69 is preferably formed of a steel band 69ª which carries a succession of box-like elements 70 which form open ended compartments, elements 70 being preferably formed with a top, as shown in Fig. 14, thus more or less accommodating the compartment to the thickness of the packet. Band 69ª is carried by a pair of wheels or disks 71, preferably having recesses 71ª which coöperate with projections 69ᵇ on the inner face of the band, projections 69ᵇ and recesses 71ª giving an action somewhat equivalent to that of a sprocket wheel and chain.

Transverse carrier 69 is operated intermittently from shaft 47ᶜ (Fig. 4), said shaft 47ᶜ driving a shaft 72 through gear connections 72ª, one of the wheels or disks 71 being mounted on shaft 72. Since shaft 47ᶜ is operated intermittently through the control provided by the Geneva stop movement 47 (indicated in detail in Fig. 8), the carrier has similar intermittent operation and with a constant length of movement, this constancy in length of movement being practically essential through the fact that element 70 must come to rest in the packet delivery station in a sufficiently accurate alinement with the second folding channel to insure that the advancing packet will properly enter the compartment of this element. An additional feature in this respect is the fact that in the further operation of the apparatus, this carrier moves the packet and must position it at a proper point to permit its introduction into the succeeding instrumentality, thus necessitating an accurate positioning action. Hence it is essential that the dimensions of the carrier be maintained. For this purpose, I have found that by the use of a steel band, this constancy in dimensions may be maintained under all working conditions, there being no material stretching possible, and the band can be made taut so as to practically eliminate sagging. In addition, the band is flexible throughout its length and is advantageous over the use of link connections, in that there is practically no wear such as is possible in chain structures; obviously, wear of parts may affect the constancy of dimensions, and this effect is eliminated by the particular form of band structure shown.

The step-by-step advance movement of carrier 69 locates the positioned packet opposite a packet-receiving space in a container-carrying dial located on one side of the transverse carrier, and opposite a plunger 73 positioned on the opposite side of said carrier and movable through the packet-receiving compartment to discharge the packet into the dial. Plunger 73 is mounted in a guiding support 73ª, and is reciprocated by the action of a cam 74, mounted on shaft 42, through the following connections:

75 indicates a vertical shaft having its lower end provided with an arm 75ª carrying a roll which coöperates with groove 74ª of cam 74, the opposite end of the shaft carrying an arm 75ᵇ which is operatively connected to the plunger by link connection 75ᶜ, the shaft and upper and lower arms functioning as a bell crank lever by means of which cam 74 imparts reciprocating movements to plunger 73.

The containers c are located in and delivered from a magazine 76 (Fig. 4), the advance side of the magazine being provided at its lower end with a space to permit the passage of the lowermost container from the magazine. The containers, of the type shown in Fig. 20, have their lid portions open and in advance of the body portion of the container. The lower container is advanced by plunger 77 which moves the container out of the magazine and into a receiving compartment formed in the container-carrying dial which compartment is located in the path of travel of the advancing container. Plunger 77 is mounted on a standard 77ª movable on the table top 40ª, the reciprocating movements being controlled by guides 77ᵇ. Plunger 77 is operated by the following mechanism:

78 indicates a cam mounted on shaft 42 (Figs. 8 and 9), this cam being adapted to oscillate a lever 79 having one end supported from the under face of table top 40ª, the opposite end of the lever being connected, by a link 79ª, with a lever 80 also supported at one end from the under face of the table, connection of link 79ª with lever 80 being at an intermediate point in the length of lever 80. At a suitable point between the connection of link 79ª and lever 80 and the outer or free end of lever 80, a link 81 is pivotally connected to the lever and to standard 77ª. These parts constitute a link motion by means of which the comparatively small throw provided by cam 78 is translated into a movement of plunger 77 a distance sufficient to advance the lower container from the magazine into the container-carrying dial, the plunger returning upon completion of this operation to permit positioning of the succeeding container in advance of the plunger.

The container-carrying dial, indicated generally at 82, is mounted on a shaft 83 having a gear connection with shaft 72 (Fig. 4), thus connecting this dial with the Geneva stop movement mechanism 47. As a result, the dial is moved intermittently through definite angular distances, each movement being followed by a dwell, being similar, in this respect, to the movements of dial 44, both dials moving concurrently. In the form shown in the drawings, the angular distance of travel of dial 82 is substantially 90°—forming four dial stations—so that each movement of the dial shifts a predetermined portion thereof to the station point opposite the advancing container. The dial is therefore provided with four container-receiving compartments, these being provided by a plurality of segments 84 (Figs. 17 and 18) secured to the under face of the dial, with the segments spaced from the dial a distance sufficient to receive the body of the container, the dial having a recess 82ª above the point where the body of the container is located when in position. As shown in Fig. 17, adjacent segments are spaced apart but combinedly form a shelf to support the container below the plane of the dial, the lid of the container passing beneath the dial as indicated in Fig. 4.

Mounted on the upper surface of dial 82 is a flanged member 85 having an interior configuration approximating that of recess 82ª, this member forming three side walls of a recess, the fourth side, at the periphery of the dial, being omitted. Member 85 preferably carries supplemental walls 85ª at opposite sides, these walls being yieldable and having the function of supporting the packet when the latter is delivered to the dial as heretofore explained, walls 85ª being located above the top plane of the body of the container, and preferably spaced therefrom as indicated in Fig. 4.

The operating paths of plungers 73 and 77, in the embodiment shown, are diametrically opposite with respect to the compartments of dial 82, the arrangement being such that when dial 82 comes to rest, both plungers are made active, plunger 77 positioning a container within the container-receiving compartment provided between the shelf and the dial, and plunger 73 moving a packet out of element 70 and into the space between walls 85ª at the diametrically opposite point of the dial. The dial moves counter-clockwise in Fig. 1, and by this general arrangement, a container is positioned in a compartment at the container-receiving station, the dial then being shifted a distance of 90° to the succeeding station carrying the positioned container half the distance toward the point where the packet is received—a point of inactivity, as no work is performed at the second station, the container at the fourth station opposite being operated on at this time as presently explained—and then shifted to the third station, a position diametrically opposite that at which the container was received. In this station the packet is introduced between walls 85ª by movement of plunger 73, thereby locating the packet directly above the body portion of the container, as shown in Fig. 4, Figs. 19 and 20, as heretofore pointed out, indicating somewhat the relative positions of the two elements of the package.

While in this station, the packet is moved downwardly into the body of the container, this action being provided by a shifting instrumentality operated by cam 86 carried by shaft 42, the shifting instrumentality including a vertically reciprocating bar 86ª carrying a member 87 which projects laterally in two directions (Fig. 1), one end of member 87 carrying a depending plate or plunger head 88 operative above the positioned packet, movements of cam 86 causing plate 88 to operate in the nature of a plunger for shifting the positioned packet from between walls 85ª and into the body portion of the container.

The completion of the movement of plate 88 which first positions the packet within the container and then returns to a position above the plane of the dial, permits the dial to have its succeeding movement thereby carrying the embyro package to the next or fourth station where the open side of the dial compartment is opposite the entrance to a channel into which the package is moved by shifting the package from its compartment into the channel, this shifting action being provided by means of an ejecting mechanism in the form of a lever 89 (Fig. 8) having one end depending from the table and having its opposite end connected to a slidable member 90 having an upwardly extending projection or toe 90ª which extends upward above the plane of segments 84, but which is normally located at a position inside of the inner edges of the segments (Fig. 1), and in a position beyond the container lid. Lever 89 is oscillated from an arm 75ᵈ (Fig. 8) connected with shaft 75, said arm being connected with lever 89 by a link 91. Member 90 lies below the space between adjacent segments and the oscillatory movements of lever 89 cause the projection 90ª to contact with the lid and shift the embryo package out of the compartment in the dial and into the channel, projection 90ª moving through the space between the segments during this shifting operation and while returning to normal position.

Figure 30:
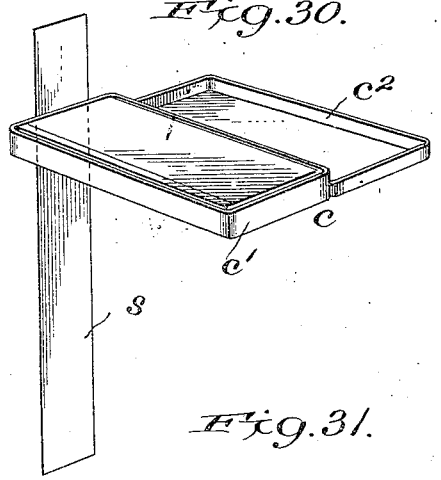

The channel into which the embryo package is delivered from the dial is indicated at 92, the position of the container in the channel being indicated in dotted lines in Fig. 1, a cross-sectional view of the channel being shown in Fig. 6, in which one side of the channel is provided with an opening 92ª through which the package is delivered to the position shown in Fig. 1, the channel having a width sufficient to receive the embryo package as shown in Fig. 30. In this position of the package, its rear end is in advance of a reciprocating plunger 93 supported on a standard 93ª (Fig. 9) mounted in guides 93ᵇ, the advance end of the plunger, as shown in Fig. 1, being adapted to contact with and therefore having a configuration to conform to the projection of the lid relative to the body portion of the container due to the larger area of the lid. Plunger 93 is reciprocated by the movement of lever 80 heretofore described, the free end of said lever having a connection with standard 93ª by a link 94 (Fig. 8), the link motion heretofore referred to and which operates plunger 77 also operating plunger 93, these plungers having movements in unison, although the length of movement of the two plungers is different.

Formed in the upper and lower walls of channel 92 are openings 95 through which a stamp is adapted to be fed, the openings being positioned in such manner that the stamp will extend in the path of travel of the advance end of the body portion of the container. The stamp feed mechanism is omitted from Fig. 1, opening 95 indicating the point where the stamp is delivered from a stamp feed mechanism illustrated more or less conventionally in Fig. 5, the specific structure of which is more particularly shown and described in my companion application filed March 13, 1917, Ser. No. 154,447. For purposes of explanation, it may be noted that the stamps are fed from a stamp magazine 96 by a reciprocating feeder 97 which delivers the bottom stamp into a stamp advancing structure shown in the form of belts 98 between which the stamp is carried past an adhesive-applying mechanism 99 (which may be a moistening mechanism where the stamps have been previously adhesively-coated), the stamp being delivered downward through openings 95 into proper position, such for instance, as shown in Fig. 30, the adhesive surface being at the rear and hence adapted to contact with the advance end of the body portion of the container when the latter is advanced by plunger 93.

Figure 31:
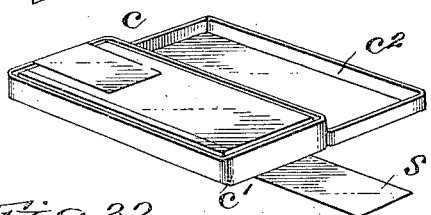
Figure 32:
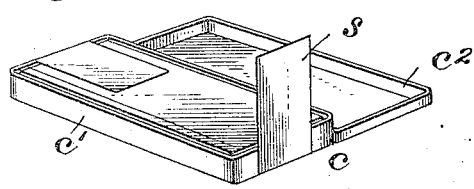

As will be understood, advance of the packet by the plunger after contacting with the stamp, causes the portion of the stamp above the container body portion to be led on top of the packet as shown in Fig. 31, the portion of the stamp below the body portion being led on to the bottom of the body portion of the container, the unattached portion of the stamp trailing behind said body portion as indicated in Fig. 31, this effect being produced by the advance of the package through the channel and into a position at the end of said channel, a point where the bottom and top of the channel is omitted the front wall of the channel being maintained, the back of the channel at this point, being formed by a yieldable wall 92ᵇ (Figs. 15 and 16), the advancing package being practically clamped between the front wall of the channel and this yieldable wall when plunger 93 completes its movement, the trailing portion of the stamp shown in Fig. 31 remaining within the channel.

While the embryo package is thus supported, a plate 100 depending from the other arm of member 87 heretofore referred to, moves downwardly, carrying the package out of the plane of channel 92 and on to a table 101 extending on a plane below that of the channel. This downward movement of the package causes the trailing portion of the stamp to be folded upward, as in Fig. 32, through the coöperation of the rear end of the body portion of the box with the lower wall of channel 92, the completion of the downward movement of plate 100 locating the package on the table between flanges 101ª which project upwardly at the front and rear of table 101 and which form guides between which the package travels as it advances over the table.

As shown in Fig. 5, the position of the downwardly-shifted package is in advance of an arm 102 carried by a rod 103 which is affixed to standard 93ª, the opposite end of the rod being loosely supported in a bearing 104. Arm 102 is provided with a lateral offset or extension 102ª extending forwardly and which is preferably provided with suitable wiping means shown as in the form of a wiping brush 102ᵇ.

As will be understood, advancing movement of plunger 93 and its standard 93ª will also advance rod 103 with its arm 102. The lateral offset or extension 102ª is positioned so that during the advancing movement of arm 102, the wiping brush 102ᵇ will contact with the upwardly projecting portion of the stamp of Fig. 32, and since the container at this time is stationary, the advance movement of the brush will advance this projecting portion of the stamp and wipe it on to the rear portion of the packet as shown in Fig. 33, the parts being arranged in such manner that this wiping action is completed slightly in advance of the time when the arm 102 comes in contact with the rear end of the body portion of the box. After such contact is had, the container is advanced bodily by arm 102 along the top of the table, as shown in dotted lines in Fig. 5, the return movement of plunger 93 carrying arm 102 to its rear position ready for action on the succeeding container.

Further advancing movement of a container from the point shown by the dotted line representation of arm 102 in Fig. 5, is provided by succeeding containers, each container as it is advanced by arm 102 moving the preceding containers forward. It will be understood that during these various described operations, the lid remains in its open position, and this condition is retained until the advance of a container brings its lid into the path of a lid lifting member or cam element 105 (Figs. 5, 15 and 16), this member being adapted to gradually raise the lid and swing it on its pivot to a point where the lid may fall in a direction tending to close the lid, as for instance the position shown in Fig. 7, this being in an approximate position, member 105 being adapted to positively force the lid closed sufficiently to permit it to pass beneath a plunger 106 (Fig. 7) carried on a vertically reciprocating rod or bar 107, the movements of which are controlled by a cam 108 and spring or other equivalent means 109. Plunger 106 is provided for completely closing the lid, and to facilitate this action, means is provided for pressing the front wall of the body portion of the container inward, this means being shown as in the form of a spring supported member 110 extending through the front guiding flange of table 101, this member being located in the path of travel of a member 111 carried by arm 107ª which supports plunger 106, member 111 having an inclined face which contacts with member 110 as the plunger moves downwardly, forcing member 110 against the front face of the container and pressing this wall of the container inward so that the flanges of the lid can readily pass over the top of the body portion.

This operation closes the container and completes the package which is moved out of position by the succeeding advancing container. After completion the package may be taken to any suitable point.

This completes the cycle of operation of the apparatus, and as will be readily seen, the operating mechanisms are such that accurate positioning of the package elements is had, and that the timing arrangements are such as to provide for maximum capacity while, at the same time, the operating mechanisms are of a simple and efficient type. This will be understood from a brief statement as to the relative timing.

As will be readily understood, a completed package is delivered from the apparatus for each container and plug introduced into the apparatus, the introduction of these taking place concurrently. The wrapping mechanism is arranged so that after the embryo packet has reached carrier 57, and plunger 49 returns, the apparatus is ready to receive the succeeding plug or charge, so that the capacity of the apparatus is practically controlled by the time required for the completion of the cycle of plunger 49 together with the possible increase in time which may occur in moving the dials, the arrangement of parts being such that while there may be a plurality of embryo packets, completed packets, and embryo packages within the apparatus at the same time, these elements are so positioned as not to conflict and hence the successive instrumentality operations each perform their functions on a successive supply stream for the instrumentality, the different instrumentality operations being so timed and related as to take place during some part of this time period which is practically co-extensive with the complete cycle of operation of plunger 49, each instrumentality performing its complete function during this period on the particular supply on which it is to operate.

While I have shown and described one way in which the general principles may be carried into effect, it will be obvious that variations and modifications therein may be required or desired to meet particular conditions of use, and I desire to be understood as reserving the right to make any and all such changes or modifications as may be found necessary or desirable in so far as the same may fall within the spirit and scope of the invention as set forth in the accompanying claims when broadly construed.

Having thus described my invention, what I claim as new, is:

1. In packaging machines, wrapping mechanism for wrapping articles or charges to produce a succession of wrapped packets, means for supporting a succession of preformed containers with each container open to receive a packet, each container having a body portion and a lid into which the body portion telescopes, means for assembling a packet and container by positioning the packet within the open container to produce an embryo package, and means for closing the container lid to complete the package after the packet has been positioned.

2. In packaging machines, wrapping mechanism for wrapping articles or charges to produce a succession of wrapped packets, means for supporting a succession of preformed containers with each container open to receive a packet, each container having a body portion and a lid into which the body portion telescopes, means for transferring the packets successively to predetermined positions relative to said container-supporting means, means for shifting the positioned packet into its open container to produce an embryo package, and means for closing the container lid to complete the package after the packet has been positioned.

3. In packaging machines, wrapping mechanism for wrapping articles or charges to produce a succession of wrapped packets, means for supporting a succession of preformed containers with each container open to receive a packet, means for transferring the packets successively to predetermined positions relative to said container-supporting means, means for shifting the positioned packet into its open container to produce an embryo package, and means for closing the container to complete the package after the packet has been positioned, said transfer means including an endless carrier adapted to receive the packets from the wrapping mechanism and movable to position the packet opposite the container-supporting means, and a reciprocating plunger for transferring the packet from the endless carrier to the container-supporting means.

4. In packaging machines, wrapping mechanism for wrapping articles or charges to produce a succession of wrapped packets, means for supporting a succession of preformed containers with each container open to receive a packet, means for transferring the packets successively to predetermined positions relative to said container-supporting means, means for shifting the positioned packet into its open container to produce an embryo package, and means for closing the container to complete the package after the packet has been positioned, said transfer means including an endless carrier adapted to receive the packets from the wrapping mechanism and movable to position the packet opposite the container-supporting means, and a reciprocating plunger for transferring the packet from the endless carrier to the container-supporting means, said packet-shifting means including a vertically reciprocating plunger operative after the packet has been positioned in the container-supporting means.

5. In packaging machines, wrapping mechanism for wrapping articles or charges to produce a succession of wrapped packets, means for supporting a succession of preformed containers with each container open to receive a packet, means for assembling a packet and container by positioning the packet within the open container to produce an embryo package, and means for closing the container to complete the package after the packet has been positioned, said assembling means including an endless carrier having open-ended packet-receiving compartments, said carrier being movable in a direction to transfer a packet laterally from the wrapping mechanism and position a packet opposite said container-supporting means, and a reciprocating plunger operative to transfer the positioned packet to said supporting means.

6. In packaging machines, wrapping mechanism for wrapping articles or charges to produce a succession of wrapped packets, means for supporting a succession of preformed containers with each container open to receive a packet, means for assembling a packet and container by positioning the packet within the open container to produce an embryo package, and means for closing the container to complete the package after the packet has been positioned, said assembling means including an endless carrier having open-ended packet-receiving compartments, said carrier being movable in a direction to transfer a packet laterally from the wrapping mechanism and position a packet opposite said container-supporting means, and a reciprocating plunger operative to transfer the positioned packet to said supporting means, said plunger being movable in a direction transverse to the direction of travel of the carrier.

7. In packaging machines, wrapping mechanism for wrapping articles or charges to produce a succession of wrapped packets, means for supporting a succession of preformed containers with each container open to receive a packet, means for assembling a packet and container by positioning the packet within the open container to produce an embryo package, and means for closing the container to complete the package after the packet has been positioned, said container-supporting means including a rotatable dial structure movable intermittently and having an assembling station at which said assembly means is rendered active.

8. In packaging machines, wrapping mechanism for wrapping articles or charges to produce a succession of wrapped packets, means for supporting a succession of preformed containers with each container open to receive a packet, means for assembling a packet and container by positioning the packet within the open container to produce an embryo package, and means for closing the container to complete the package after the packet has been positioned, said container-supporting means including a rotatable dial having a plurality of work-performing stations, said dial receiving the open container at one station, said assembling means being rendered active at another station and being operative to locate the charge in the positioned container.

9. In packaging machines, wrapping mechanism for wrapping articles or charges to produce a succession of wrapped packets, means for supporting a succession of preformed containers with each container open to receive a packet, each container having a body portion and a lid into which the body portion telescopes, means for assembling a packet and container by positioning the packet within the open container to produce an embryo package, a runway for receiving the embryo package, means for advancing the package in the direction of length of the runway, and means for closing the container lid to complete the package while on said runway.

10. In packaging machines, wrapping mechanism for wrapping articles or charges to produce a succession of wrapped packets, means for supporting a succession of preformed containers with each container open to receive a packet, means for assembling a packet and container by positioning the packet within the open container to produce an embryo package, means for applying a stamp or label to the embryo package with the ends of the stamp connected to end portions of the positioned packet and an intermediate stamp or label portion connected to an external face of the container, and means for closing the container to complete the package after the stamp has been applied.

11. In packaging machines, wrapping mechanism for wrapping articles or charges to produce a succession of wrapped packets, means for supporting a succession of preformed containers with each container open to receive a packet, means for assembling a packet and container by positioning the packet within the open container to produce an embryo package, means for applying a stamp or label to the embryo package with the ends of the stamp connected to end portions of the positioned packet and an intermediate stamp or label portion connected to an external face of the container, and means for closing the container to complete the package after the stamp has been applied, said stamp applying means including a runway to which the embryo package is delivered, means for advancing the package in the direction of length of the runway, and means for feeding and applying the stamp or label while the package is supported by the runway.

12. In packaging machines, wrapping mechanism for wrapping articles or charges to produce a succession of wrapped packets, means for supporting a succession of preformed containers with each container open to receive a packet, means for assembling a packet and container by positioning the packet within the open container to produce an embryo package, means for applying a stamp or label to the embryo package with the ends of the stamp connected to end portions of the positioned packet and an intermediate stamp or label portion connected to an external face of the container, and means for closing the container to complete the package after the stamp has been applied, said stamp applying means including stamp feed mechanisms adapted to position a succession of stamps or labels in the path of travel of an advancing embryo package, and means for folding a positioned stamp into its applied position.

13. In packaging machines, wrapping mechanism for wrapping articles or charges to produce a succession of wrapped packets, means for supporting a succession of preformed containers with each container open to receive a packet, means for assembling a packet and container by positioning the packet within the open container to produce an embryo package, means for applying a stamp or label to the embryo package with the ends of the stamp connected to end portions of the positioned packet and an intermediate stamp or label portion connected to an external face of the container, and means for closing the container to complete the package after the stamp has been applied, said stamp applying means including stamp feed mechanism adapted to position a succession of stamps or labels in the path of travel of an advancing embryo package, and means for folding a positioned stamp into its applied position, said folding means including a wiping instrumentality operative to apply one end of the stamp to the packet.

14. In machines for wrapping packages, a receiving station for the charge to be wrapped and from which the charge is advanced, a wrapper blank station, a delivery station for the wrapped packet, and wrapping mechanism intermediate the wrapper blank station and the packet delivery station, said mechanism including a pair of folding channels, and reciprocating plungers for advancing the embryo packet through said channels successively, said channels combinedly folding the wrapper to provide overlapping wrapper ends on one face of the packet, infolding of the end flaps of said wrapper ends being provided in different channels.

15. In machines for wrapping packages, a receiving station for the charge to be wrapped and from which the charge is advanced, a wrapper blank station, a delivery station for the wrapped packet, and wrapping mechanism intermediate the wrapper blank station and the packet delivery station, said mechanism including a pair of folding channels, and reciprocating plungers for advancing the embryo packet through said channels successively, said channels combinedly folding the wrapper to provide overlapping wrapper ends on one face of the packet, each channel folding one of the wrapper ends to position, infolding of the end flaps of such wrapper ends being non-concurrent.

16. In machines for wrapping packages, a receiving station for the charge to be wrapped and from which the charge is advanced, a wrapper blank station, a delivery station for the wrapped packet, and wrapping mechanism intermediate the wrapper blank station and the packet delivery station, said mechanism including a pair of folding channels, and reciprocating plungers for advancing the embryo packet through said channels successively, said channels combinedly folding the wrapper to provide overlapping wrapper ends on one face of the packet, each channel folding one of the wrapper ends and its end flaps to position.

17. In machines for wrapping packages, a receiving station for the charge to be wrapped and from which the charge is advanced, a wrapper blank station, a delivery station for the wrapped packet, and wrapping mechanism intermediate the wrapper blank station and the packet delivery station, said mechanism including a pair of folding channels, and reciprocating plungers for advancing the embryo packet through said channels successively, said channels combinedly folding the wrapper to provide overlapping wrapper ends on one face of the packet, each channel folding one of the wrapper ends to position, the end flaps of the first folded wrapper end being infolded in advance of the folding of the other wrapper end.

18. In machines for wrapping packages, a receiving station for the charge to be wrapped and from which the charge is advanced, a wrapper blank station, a delivery station for the wrapper packet, and wrapping mechanism intermediate the wrapper blank station and the packet delivery station, said mechanism including a pair of folding channels, and reciprocating plungers for advancing the embryo packet through said channels successively, said channels combinedly folding the wrapper to provide overlapping wrapper ends on one face of the packet, each channel having tucking-in and end flap folders.

19. In machines for wrapping packages, a receiving station for the charge to be wrapped and from which the charge is advanced, a wrapper blank station, a delivery station for the wrapped packet, and wrapping mechanism intermediate the wrapper blank station and the packet delivery station, said mechanism including a pair of folding channels, and reciprocating plungers for advancing the embryo packet through said channels successively, said channels combinedly folding the wrapper to provide overlapping wrapper ends on one face of the packet, each channel having tucking-in and end flap folders, with the tucking-in folders active in advance of the end flap folders, the end flap folders of the second channel being operative on flaps of opposite faces of the packet.

20. In machines for wrapping packages, a receiving station for the charge to be wrapped and from which the charge is advanced, a wrapper blank station, a delivery station for the wrapped packet, and wrapping mechanism intermediate the wrapper blank station and the packet delivery station, said mechanism including a pair of folding channels, and reciprocating plungers for advancing the embryo packet through said channels successively, said channels combinedly folding the wrapper to provide overlapping wrapper ends on one face of the packet, each channel having tucking-in and end flap folders, the end flap folders of the first channel being active in advance of completion of the overlapping folds of the wrapper ends.

21. In packaging machines, wrapping mechanism for wrapping a charge to produce a wrapped packet, said mechanism including opposing parallel plates forming a folding channel through which the wrapper and charge are advanced to provide wrapper folding action, said channel having independent tucking-in and end flap folders positioned successively in the direction of length of the channel, means carried by plate edges for supporting said folders, and springs interposed between the folders and said means for yieldably supporting the folders, said means, folders and springs forming a unit detachable bodily from the plates.

22. In packaging machines, wrapping mechanism for wrapping a charge to produce a wrapped packet, said mechanism including a folding channel through which the wrapper and charge are advanced to provide wrapper folding action, said channel having independent tucking-in and end flap folders positioned successively in the direction of length of the channel, each folder being adjustably and yieldably supported as a unit detachable bodily.

23. In packaging machines, wrapping mechanism for wrapping a charge to produce a wrapped packet, said mechanism including opposing parallel plates forming a folding channel through which the wrapper and charge are advanced to provide wrapper folding action, said channel having independent tucking-in and end flap folders positioned successively in the direction of length of the channel, and means carried by plate edges for supporting said folders, said folders extending in overlapping relation, and each forming a unit detachable bodily through a side of the channel.

24. In packaging machines, wrapping mechanism for wrapping a charge to produce a wrapped packet, said mechanism including a folding channel through which the wrapper and charge are advanced to provide wrapper folding action, said channel having independent tucking-in and end flap folders individually and adjustably supported and positioned successively in the direction of length of the channel, successive folders being in overlapping relation, and each forming a unit detachable bodily through a side of the channel.

25. In packaging machines, wrapping mechanism for wrapping a charge to produce a wrapped packet, said mechanism including a folding channel through which the wrapper and charge are advanced to provide wrapper folding action, said channel having independent tucking-in and end flap folders individually supported and positioned successively in the direction of length of the channel, and each forming a unit detachable bodily through a side of the channel, said tucking-in folders having tail portions overlapping the succeeding end flap folders.

26. In packaging machines, wrapping mechanism for wrapping a charge to produce a wrapped packet, said mechanism including a folding channel through which the wrapper and charge are advanced to provide wrapper folding action, said channel having independent tucking-in and end flap folders individually supported and positioned successively in the direction of length of the channel, and each forming a unit detachable bodily through a side of the channel, said tucking-in folders having tail portions overlapping the operating zone of the succeeding end flap folders to permit flap-folding in rear of the tail portions.

27. In packaging machines, wrapping mechanism for wrapping a charge to produce a wrapped packet, said mechanism including a folding channel through which the wrapper and charge are advanced to provide wrapper folding action, said channel having independent tucking-in and end flap folders positioned successively in the direction of length of the channel, and each forming a unit detachable bodily through a side of the channel, said end flap folders including successive folders operative on opposing end flaps, said successive folders being in overlapping relation, with the advanced folder formed to permit flap-folding by the succeeding folder in rear of the folder formation of the advance folder.

28. In packaging machines, wrapping mechanism for wrapping a charge to produce a wrapped packet, said mechanism including a folding channel through which the wrapper and charge are advanced to provide wrapper folding action, said channel having independent tucking-in and end flap folders positioned successively in the direction of length of the channel, and each forming a unit detachable bodily through a side of the channel, successive end flap folders being operative on opposite end flaps of the wrapper, said tucking-in and the advance end flap folders having tail portions overlapping the body portions of the succeeding folders, whereby the folded formations will be maintained in position during successive folding operations.

29. In packaging machines, wrapping mechanism for wrapping a charge to produce a wrapped packet, said mechanism including a pair of folding channels through which the wrapper and charge are successively advanced, each of said channels having independent tucking-in and end flap folders positioned successively in the direction of length of the channel.

30. In packaging machines, wrapping mechanism for wrapping a charge to produce a wrapped packet, said mechanism including a pair of folding channels through which the wrapper and charge are successively advanced, each of said channels having independent tucking-in and end flap folders positioned successively in the direction of length of the channel, said folders being yieldably supported.

31. In packaging machines, wrapping mechanism for wrapping a charge to produce a wrapped packet, said mechanism including a pair of folding channels through which the wrapper and charge are successively advanced, each of said channels having independent tucking-in and end flap folders positioned successively in the direction of length of the channel, said folders each being yieldably and adjustably supported.

32. In machines for wrapping packages, wrapping mechanism for wrapping a charge to produce a wrapped packet, said mechanism including a pair of folding channels extending in parallel planes and through which the wrapper and charge are successively advanced in opposite directions, a carrier for receiving the embryo packet from one channel and movable to deliver it opposite the entrance to the other channel, said carrier having an open-ended compartment for receiving the packet, and means for shifting the packet from said compartment into a channel, a wall of said compartment having an opening to permit carrier shifting in the presence of said means.

33. In machines for wrapping packages, wrapping mechanism for wrapping a charge to produce a wrapped packet, said mechanism including a pair of folding channels extending in parallel planes and through which the wrapper and charge are successively advanced in opposite directions, and a carrier for receiving the embryo packet from one channel and movable to deliver it opposite the entrance to the other channel, said carrier having an open-ended compartment for receiving the packet, the lower wall of said compartment being formed by opposed members extending in the same plane and spaced apart to form an opening therebetween intermediate the sides of the compartment.

34. In packaging machines adapted to wrap a charge and inclose it within a preformed container, wrapping mechanism, means for feeding charges to said wrapping mechanism successively, a container carrier, means for feeding open containers to the carrier successively, means for operatively connecting said charge feeding means and said container carrier to operate in unison, and means for delivering the wrapped charge in packet form into a container while the latter is in position on the carrier.

35. In packaging machines adapted to wrap a charge and inclose it within a preformed container, wrapping mechanism, means for feeding charges to said wrapping mechanism successively, a container carrier, means for feeding open containers to the carrier successively, means for operatively connecting said charge feeding means and said container carrier to operate in unison, and means for transferring the wrapped charge in packet form from the wrapping mechanism to and into position within a container while the latter is located on the carrier.

36. In packaging machines adapted to wrap a charge and inclose it within a preformed container, wrapping mechanism, a rotatable dial for delivering charges to said mechanism successively, a container carrier, means for feeding open containers to the carrier successively, means for operatively connecting said dial and said container carrier to operate in unison, and means for delivering the wrapped charge in packet form into a container while the latter is in position on the carrier.

37. In packaging machines adapted to wrap a charge and inclose it within a preformed container, wrapping mechanism, means for feeding charges to said wrapping mechanism successively, a rotatable dial for carrying containers, means for feeding open containers to said dial, said charge feeding means and said dial being operatively connected to operate in unison, and means for delivering the wrapped charge in packet form into a container while the latter is in position on the dial.

38. In packaging machines wherein a foldable wrapping element is doubled and folded relatively to the package contents during advancing movements of the contents and element to produce an embryo packet and delivery to a packet-delivery station, instrumentalities for completing the package, and means operative to transfer the packet from the packet-delivery station to said instrumentalities, said means including an endless steel band carrying a plurality of spaced packet-receiving compartments and also carrying spaced projections, and means for moving said band and including a wheel having recesses into which said projections extend during travel of the band in contact with said wheel.

39. In packaging machines adapted to wrap a charge and inclose it within a preformed container, wrapping mechanism having a packet delivery station, a rotatable container carrier having means for supporting a wrapped packet above an open container, means for feeding open containers to said carrier successively, and means for transferring a wrapped packet from said station to the packet supporting means of said container carrier.

40. In packaging machines adapted to wrap a charge and inclose it within a preformed container, wrapping mechanism having a packet delivery station, an intermittently movable container carrier having means for supporting a wrapped packet above an open container, means for feeding open containers to said carrier successively, and means for transferring a wrapped packet from said station to the packet-supporting means of the container carrier, said packet being delivered to the supporting means while the container carrier is stationary.

41. In packaging machines adapted to wrap a charge and inclose it within a preformed container, wrapping mechanism having a packet delivery station, a rotatable container carrier having means for supporting a wrapped packet above an open container, means for feeding open containers to said carrier successively, means for transferring a wrapped packet from said station to the packet-supporting means of said container carrier, and means for shifting the positioned packet into the container while the latter is in position on the carrier.

42. In packaging machines adapted to wrap a charge and inclose it within a preformed container, wrapping mechanism having a packet delivery station, a rotatable container carrier having means for supporting a wrapped packet above an open container, means for feeding open containers to said carrier successively, and means for transferring a wrapped packet from said station to the packet-supporting means of said container carrier, said transfer means including an intermittently movable conveyer having an open-ended packet-receiving compartment movable from a position within said station to a position opposite packet-supporting means of the carrier, and means for shifting the packet from said compartment to its supporting means.

43. In packaging machines adapted to wrap a charge and inclose it within a preformed container, wrapping mechanism having a packet delivery station, a rotatable container carrier having means for supporting a wrapped packet above an open container, means for feeding open containers to said carrier successively, and means for transferring a wrapped packet from said station to the packet supporting means of said container carrier, said transfer means including an endless band carrying a plurality of independent open-ended packet-receiving compartments, means for moving said band intermittently to locate a compartment in said station to receive the packet while the conveyer is at rest and to move the positioned packet to a point opposite packet-supporting means of the carrier, and means for shifting the positioned packet from its compartment to its supporting means while the conveyer is at rest.

44. In packaging machines adapted to wrap a charge and inclose it within a preformed container, wrapping mechanism having a packet delivery station, a rotatable container carrier having means for supporting a wrapped packet above an open container, means for feeding open containers to said carrier successively, and means for transferring a wrapped packet from said station to the packet-supporting means of said container carrier, said transfer means including an endless band carrying a plurality of independent open-ended packet-receiving compartments, means for moving said band intermittently to concurrently locate one compartment within said station to receive a wrapped packet and another compartment in position opposite packet-supporting means of said carrier, and means operative relatively to the last-mentioned compartment for shifting a packet therefrom into its packet-supporting position, whereby said conveyer may concurrently receive one packet from the wrapping mechanism and deliver another to the carrier.

45. In packaging machines adapted to inclose a charge within a preformed container, a rotatable container carrier having a container-receiving compartment and a charge-supporting structure above said compartment, means for feeding open containers into said compartment, and means for locating a charge in its supporting means after the container has been positioned.

46. In packaging machines adapted to inclose a charge within a preformed container, a rotatable container carrier having a container-receiving compartment and a charge-supporting structure above said compartment, means for feeding open containers to said compartment, means for locating a charge in its supporting structure while the container is in position, and means for shifting the positioned charge into the container.

47. In packaging machines adapted to inclose a charge within a preformed container, a rotatable dial having a plurality of container-receiving compartments and also having charge-supporting means positioned above each compartment, means for feeding open containers to the compartments successively, and means for delivering charges successively to the supporting means of the occupied compartments.

48. In packaging machines adapted to inclose a charge within a preformed container, a rotatable container carrier, and means for locating a succession of charges and a succession of open containers on said carrier in relative positions to permit a charge to be shifted into its container by a downward movement, said carrier including a dial having a plurality of container-receiving compartments and a corresponding number of charge-receiving supporting structures positioned above said compartments.

49. In packaging machines adapted to inclose a charge within a preformed container, a rotatable container carrier, and means for locating a succession of charges and a succession of open containers on said carrier in relative positions to permit a charge to be shifted into its container by a downward movement, said carrier including a dial having a plurality of recesses extending inwardly at spaced apart points of its periphery, yieldable charge-supporting walls located at opposite sides of each recess, and container-supporting means carried by the dial and positioned to form container-receiving compartments below said recesses.

50. In packaging machines adapted to inclose a charge within a preformed container, a rotatable container carrier, and means for locating a succession of charges and a succession of open containers on said carrier in relative positions to permit a charge to be shifted into its container by a downward movement, said carrier including a dial having a plurality of recesses extending inwardly at spaced apart points of its periphery, yieldable charge-supporting walls located at opposite sides of each recess, and a plurality of segments secured below the dial and adapted to form container-receiving compartments beneath said recesses.

51. In packaging machines adapted to inclose a charge within a preformed container, a rotatable container carrier, and means for locating a succession of charges and a succession of open containers on said carrier in relative positions to permit a charge to be shifted into its container by a downward movement, said carrier including a dial having a plurality of recesses extending inwardly at spaced apart points of its periphery, yieldable charge-supporting walls located at opposite sides of each recess, and a plurality of segments secured below the dial and adapted to form container-receiving compartments beneath said recess, each compartment extending inwardly beyond the recess.

52. In packaging machines adapted to inclose a charge within a preformed container, a rotatable container carrier, and means for locating a succession of charges and a succession of open containers on said carrier in relative positions to permit a charge to be shifted into its container by a downward movement, said carrier including a dial having a plurality of recesses extending inwardly at spaced apart points of its periphery, yieldable charge-supporting walls located at opposite sides of each recess, a dial having a plurality of recesses extending inwardly at spaced apart points of its periphery, means for yieldably supporting a charge between opposite walls of each recess, and container-supporting means carried by the dial and positioned to form container-receiving compartments below said recesses..

53. In packaging machines adapted to inclose a charge within a preformed container, a rotatable container carrier, and means for locating a succession of charges and a succession of open containers on said carrier in relative positions to permit a charge to be shifted into its container by a downward movement, said carrier including a dial having a plurality of recesses extending inwardly at spaced apart points of its periphery, yieldable charge-supporting walls located at opposite sides of each recess, and a plurality of segments secured below the dial and adapted to form container-receiving compartments beneath said recesses, said segments being spaced apart below the recesses.

54. In packaging machines adapted to inclose a charge within a preformed container, a rotatable carrier adapted to receive a succession of open containers and a corresponding succession of charges with each charge positioned above its container, means for shifting the charge into its container, and means for delivering the container from the carrier after the charge has been positioned.

55. In packaging machines adapted to inclose a packet within a preformed container, a rotatable carrier having a plurality of stations and adapted to receive a succession of open containers and a corresponding succession of packets, means for feeding the containers and packets to the carrier at different stations and for positioning a packet on the carrier in predetermined relation to the container, means for locating a positioned packet in its container at one of the stations to produce an embryo package, and means for deliverying the package from the carrier at a different station.

56. In packaging machines adapted to inclose a packet within a preformed container, a rotatable carrier having a plurality of stations and adapted to receive a succession of open containers and a corresponding succession of packets, means for feeding open containers successively to the carrier at one of said stations, means for feeding a succession of packets to the carrier at a succeeding station with the packet positioned above the container, means for moving the packet into the container at said latter station to form an embryo package, and means for delivering the package from the carrier at a succeeding station.

57. In packaging machines adapted to inclose a charge within a preformed container, a rotatable carrier having a plurality of stations and adapted to receive a succession of open containers and a corresponding succession of charges, means for assembling a charge and container at one of said stations to form an embryo package, a package-receiving channel having an opening opposite a succeeding carrier station, means operative at said latter station for shifting the embryo package from the carrier to the channel, and means operative subsequently to the packet-shifting for completing the package formation.

58. In packaging machines adapted to inclose a charge within a preformed container, a rotatable carrier having a plurality of stations and adapted to receive a succession of open containers and a corresponding succession of charges, means for assembling a charge and container at one of said stations to form an embryo package, a package-receiving channel having an opening opposite a succeeding carrier station, and means operative at said latter station for shifting the package from the carrier to the channel, said latter means including a lever movable below the plane of the package and having a projection extending into the package plane and adapted to engage the package during the shifting movement.

59. In packaging machines adapted to inclose a charge within a preformed container, a rotatable carrier adapted to receive a succession of open containers and a corresponding succession of charges and having an assembling station and a delivery station, means operative at the assembling station for assembling a charge and its container to form an embryo package, a package-receiving structure opposite the delivery station, means for transferring the package from the carrier to the receiving structure at the delivery station, and means for advancing the package in said structure and for closing the container during such advancing movement.

60. In packaging machines adapted to inclose a charge within a preformed container, a rotatable carrier adapted to receive a succession of open containers and a corresponding succession of charges and having a container-receiving station, an assembling station, and a delivery station, a reciprocating plunger for introducing the containers at the container-receiving station, assembling means at the assembling station for producing an embryo package, a package-receiving channel opposite the delivery station, means for shifting the package from the carrier into the channel at said latter station, a reciprocating plunger for advancing the package through said channel, and means for reciprocating said plungers.

61. In packaging machines adapted to inclose a charge within a preformed container, a rotatable carrier adapted to receive a succession of open containers and a corresponding succession of charges and having a container-receiving station, an assembling station, and a delivery station, a reciprocating plunger for introducing the containers at the container-receiving station, assembling means at the assembling station for producing an embryo package, a package-receiving channel opposite the delivery station, means for shifting the package from the carrier into the channel at said latter station, a reciprocating plunger for advancing the package through said channel, and means operatively connecting said plungers to provide reciprocating movements in unison.

62. In packaging machines adapted to inclose a charge within a preformed container, a rotatable carrier adapted to receive a succession of open containers and a corresponding succession of charges and having a container-receiving station, an assembling station, and a delivery station, a reciprocating plunger for introducing the containers at the container-receiving station, assembling means at the assembling station for producing an embryo package, a package-receiving channel opposite the delivery station, means for shifting the package from the carrier into the channel at said latter station, a reciprocating plunger for advancing the package through said channel, and means operatively connecting said plungers to provide reciprocating movements in unison, said means including a link motion structure, and a cam for moving said structure, whereby both plungers are actuated from a single source.

63. In packaging machines adapted to inclose a charge within a preformed container to produce a package having a stamp or label secured to both charge and container, a rotatable carrier adapted to receive a succession of open containers and a corresponding succession of charges, means for assembling a charge and its open container while on said carrier to form an embryo package, a package-receiving channel, means for delivering the embryo package from the carrier to said channel with the container open, stamp or label feed means adapted to position a succession of stamps to intersect said channel, and means for applying a stamp to the charge and its container by advancing movements of the package through the channel.

64. In packaging machines adapted to inclose a charge within a preformed container to produce a package having a stamp or label secured to both charge and container, a rotatable carrier adapted to receive a succession of open containers and a corresponding succession of charges, means for assembling a charge and its open container while on said carrier to form an embryo package, stamp-applying mechanism including a folding channel, means for delivering the package from the carrier to said channel, said mechanism also including stamp feed means adapted to position a succession of stamps or labels to intersect said channel, and means for advancing a package into contact with a positioned stamp and for folding the stamp or label into contact with the charge and container during such advancing movement.

65. In packaging machines adapted to inclose a charge within a preformed container to produce a package having a stamp or label secured to both charge and container, a rotatable carrier adapted to receive a succession of open containers and a corresponding succession of charges, means for assembling a charge and its open container while on said carrier to form an embryo package, stamp-applying mechanism, and means for transferring the package from the carrier to said mechanism, said mechanism including a folding channel into which the package is delivered with the container open, stamp or label feed means for positioning a succession of stamps or labels to intersect said channel, means for advancing the package through said channel to fold a positioned stamp into contact with one end of the charge and with a face of the container, a table below the discharge end of said channel, means for shifting the package from the plane of said channel on to said table to additionally fold the stamp or label, and means operative concurrently with said advancing means for completing the stamp application to the opposite end of the charge.

66. In packaging machines adapted to inclose a charge within a preformed container to produce a package having a stamp or label secured to both charge and container, a rotatable carrier adapted to receive a succession of open containers and a corresponding succession of charges, means for assembling a charge and its open container while on said carrier to form an embryo package, stamp-applying mechanism, and means for transferring the package from the carrier to said mechanism, said mechanism including a folding channel into which the package is delivered with the container open, stamp or label feed means for positioning a succession of stamps or labels to intersect said channel, means for advancing the package through said channel to fold a positioned stamp into contact with one end of the charge and with a face of the container, a table below the discharge end of said channel, means for shifting the package from the plane of said channel on to said table to additionally fold the stamp or label, means operative concurrently with said advancing means for completing the stamp application to the opposite end of the charge, and means for closing the container after the stamp has been positioned.

67. In packaging machines adapted to apply a stamp or label to the charge and container of an embryo package while the container is open and the charge positioned therein and to close the container after the stamp or label has been applied, stamp applying mechanism including a channel into which the embryo package is delivered with the container open, means for positioning a stamp or label to intersect the channel within the path of travel of the charge, means for advancing the package to contact the positioned stamp and to fold it with one end in contact with an end of the charge and an intermediate portion of the stamp in contact with an exterior face of the container, a table below said channel, means for shifting the partially stamped package from the plane of the channel to said table to apply an additional portion of the stamp to the container, means for applying the remainder of the stamp to the opposite end of the charge to complete the stamp application, and means for subsequently closing the container.

68. In packaging machines adapted to apply a stamp or label to the charge and container of an embryo package while the container is open and the charge positioned therein and to close the container after the stamp or label has been applied, stamp applying mechanism including a channel into which the embryo package is delivered with the container open, means for positioning a stamp or label to intersect the channel within the path of travel of the charge, means for advancing the package to contact the positioned stamp and to fold it with one end in contact with an end of the charge and an intermediate portion of the stamp in contact with an exterior face of the container, a table below said channel, means for shifting the partially stamped package from the plane of the channel to said table to apply an additional portion of the stamp to the container, said advancing means being active on the package after being positioned on the table, said advancing means carrying a wiping instrumentality rendered active to apply the remainder of the stamp to the opposite end of the charge prior to advance of the package on the table, and means for subsequently closing the container.

69. In packaging machines adapted to apply a stamp or label to the charge and container of an embryo package while the container is open and the charge positioned therein and to close the container after the stamp or label has been applied, stamp-applying mechanism including means for receiving the embryo package with the container open and for applying a stamp to the charge and container with the opposite ends of the stamp overlying and secured to opposite ends of the charge and an intermediate portion of the stamp overlying an exposed face of the container, a table on which the stamp application is completed, means for advancing the open package on said table, and container closing means operative in the path of travel of the advancing package.

70. In packaging machines adapted to apply a stamp or label to the charge and container of an embryo package while the container is open and the charge positioned therein and to close the container after the stamp or label has been applied, stamp-applying mechanism including means for receiving the embryo package with the container open and for applying a stamp to the charge and container with the opposite ends of the stamp overlying and secured to opposite ends of the charge and an intermediate portion of the stamp overlying an exposed face of the container, a table on which the stamp application is completed, means for advancing the open package on said table, and container closing means operative in the path of travel of the advancing package, said container having a body portion and a flanged lid hinged thereto, said closing means including a lid lifting structure, a plunger for closing the lifted lid, and means for pressing a wall of the body portion of the container inward during the lid closing movement.

71. In packaging machines adapted to apply a stamp or label to the charge and container of an embryo package while the container is open and the charge positioned therein and to close the container after the stamp or label has been applied, stamp-applying mechanism including means for receiving the embryo package with the container open and for applying a stamp to the charge and container with the opposite ends of the stamp overlying and secured to opposite ends of the charge and an intermediate portion of the stamp overlying an exposed face of the container, a table on which the stamp application is completed, means for advancing the open package on said table, and container closing means operative in the path of travel of the advancing package, said container having a body portion and a flanged lid hinged thereto, said closing means including a cam element in the path of travel of the open lid and adapted to lift the latter into a position to be closed, a plunger operative on the lifted lid for moving it to closed position, and means operative concurrently with the plunger closing movement for pressing a wall of the body portion of the container inward to permit free closing of the lid.

In testimony whereof I have hereunto set my hand.

HILARION DE ESCOBALES.